United States Patent
Caliga et al.

(10) Patent No.: US 12,273,149 B2
(45) Date of Patent: *Apr. 8, 2025

(54) RADIO-FREQUENCY RECEIVER PUMPED TO HIGH-AZIMUTHAL RYDBERG STATES

(71) Applicant: ColdQuanta, Inc., Boulder, CO (US)

(72) Inventors: Seth Charles Caliga, Lafayette, CO (US); Haoquan Fan, Erie, CO (US); Eric Magnuson Bottomley, Broomfield, CO (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,591

(22) Filed: Oct. 10, 2023

(65) Prior Publication Data

US 2024/0291573 A1 Aug. 29, 2024

Related U.S. Application Data

(63) Continuation of application No. 17/940,954, filed on Sep. 8, 2022, now Pat. No. 11,843,420.

(Continued)

(51) Int. Cl.
*H04B 10/00* (2013.01)
*G06N 10/40* (2022.01)
(Continued)

(52) U.S. Cl.
CPC ............ *H04B 10/70* (2013.01); *G06N 10/40* (2022.01)

(58) Field of Classification Search
CPC ............ H01Q 1/36; H04B 1/06; H04B 1/08; H04B 1/082; H04B 10/70

See application file for complete search history.

(56) References Cited

U.S. PATENT DOCUMENTS

| | | |
|---|---|---|
| 10,979,147 B2 | 4/2021 | Gordon |
| 11,165,505 B2 | 11/2021 | Gordon |

(Continued)

OTHER PUBLICATIONS

Anderson et al., Rydberg atoms for radio-frequency communications and sensing: atomic receivers for pulsed RF field and phase detection, Rydberg Technologies Inc., Ann Arbor, MI 48103 USA; Oct. 18, 2019, 10 pages.

(Continued)

*Primary Examiner* — Daniel G Dobson
(74) *Attorney, Agent, or Firm* — Schwegman Lundberg & Woessner, P.A.

(57) ABSTRACT

A radio-frequency receiver achieves high sensitivity by pumping atoms to high-azimuthal ($\ell \geq 3$) Rydberg states. A vapor cell contains quantum particles (e.g., cesium atoms). A laser system provides probe, dressing, and coupling beams to pump the quantum particles to a first Rydberg state having a high-azimuthal quantum number $\ell \geq 3$. A local oscillator drives an electric field in the vapor cell at a local oscillator frequency, which is imposed on a distribution of quantum particles between the first Rydberg state and a second Rydberg state. An incident RF signal field interferes with the local oscillator field, imposing an oscillation in the distribution at a beat or difference frequency and, consequently, on the intensity of the probe beam. The beat frequency component of the intensity of the probe beam is detected, and the detection signal is demodulated to extract information originally in the RF signal.

15 Claims, 39 Drawing Sheets

Related U.S. Application Data

(60) Provisional application No. 63/242,850, filed on Sep. 10, 2021.

(51) Int. Cl.
  *H04B 10/70* (2013.01)
  *H04J 14/00* (2006.01)

(56) References Cited

U.S. PATENT DOCUMENTS

| | | | |
|---|---|---|---|
| 11,287,319 | B2 | 3/2022 | Hugi |
| 11,349,569 | B2 | 5/2022 | Graceffo |
| 11,843,420 | B1 * | 12/2023 | Caliga ............... H04B 10/70 |
| 12,032,010 | B1 | 7/2024 | Caliga |
| 2016/0363617 | A1 | 12/2016 | Anderson |
| 2020/0292606 | A1 | 9/2020 | Holloway |
| 2021/0250101 | A1 | 8/2021 | Gordon |
| 2021/0270882 | A1 | 9/2021 | Imhof |
| 2022/0196716 | A1 | 6/2022 | Anderson |
| 2022/0228972 | A1 | 7/2022 | Nelson |
| 2023/0194590 | A1 | 6/2023 | Burton |

OTHER PUBLICATIONS

Berweger et al., Rydberg state engineering: A comparison of tuning schemes for continuous frequency sensing, Sep. 28, 2022; 11 pages.
Berweger et al., Rydberg-State Engineering: Investigations of Tuning Schemes for Continuous Frequency Sensing, Physical Review Applied 19, 044049, 13 pages, Apr. 18, 2023.
Bohaichuk et al., The Origins of Rydberg Atom Electrometer Transient Response and its Impact on Radio Frequency Pulse Sensing, Quantum Valley Ideas Laboratories, Sep. 13, 2022, 20 pages.
Cai et al., Sensitivity improvement of Rydberg atom-based microwave sensing via electromagnetically induced transparency, Nov. 15, 2021, 8 pages.
Carr et al., Three-photon electromagnetically induced transparency using Rydberg states, Optics Letters / vol. 37, No. 18, Sep. 15, 2012, 3 pages.
Carter et al., Electric field sensing near the surface microstructure of an atom chip using cold Rydberg atoms, Department of Physics and Astronomy and Institute for Quantum Computing, University of Waterloo, Dec. 21, 2013, 7 pages.
Daschner et al., Triple stack glass-to-glass anodic bonding for optogalvanic spectroscopy cells with electrical feedthroughs, Physikalisches Institut, Mar. 5, 2014, 4 pages.
David Henry Meyer, Magnetic & Electric Field Sensing And Applications Based On Coherent Effects In Neutral Atoms, 2018, 265 pages.
Fan et al., Sub-wavelength microwave electric field imaging using Rydberg atoms inside atomic vapor cells, Homer L. Dodge Department of Physics and Astronomy, The University of Oklahoma, Mar. 14, 2014, 5 pages.
Grabowski et al., High Resolution Rydberg Spectroscopy of ultracold Rubidium Atoms, Aug. 25, 2016, 9 pages.
Holloway et al., Broadband Rydberg Atom Based Self-Calibrating RF E-Field Probe, National Institute of Standards and Technology (NIST), Electromagnetics Division, 3 pages.
Holloway et al., Broadband Rydberg Atom-Based Electric-Field Probe: From Self-Calibrated Measurements to Sub-Wavelength Imaging, National Institute of Standards and Technology (NIST), U.S. Department of Commerce, Boulder Laboratories, May 27, 2014, 12 pages.
Holloway et al., Electric field metrology for SI traceability: Systematic measurement uncertainties in electromagnetically induced transparency in atomic vapor, Journal of Applied Physics 121, 233106; doi: 10.1063/1.4984201, 2017, 10 pages.
Holloway et al., Electromagnetically induced transparency based Rydberg-atom sensor for quantum voltage measurements, Oct. 26, 2021, 13 pages.
Hu et al., Continuously tunable radio frequency electrometry with Rydberg atoms, Appl. Phys. Lett. 121, 014002; https://doi.org/10.1063/5.0086357, Jul. 7, 2022, 7 pages.
Kilian Talo Theodor Singer, Interactions in an ultracold gas of Rydberg atoms, Oct. 2004, 133 pages.
Mao et al., A high-efficiency fiber-coupled Rydberg-atom integrated probe and its imaging applications, IEEE Antennas and Wireless Propagation Letters, 2022, 5 pages.
Meyer et al., Optimal Atomic Quantum Sensing using EIT Readout, Aug. 9, 2021, 12 pages.
Otto et al., Data capacity scaling of a distributed Rydberg atomic receiver array, Department of Physics, QSO-Centre for Quantum Science, and Dodd-Walls Centre, University of Otago, Dunedin, New Zealand, Apr. 8, 2021, 10 pages.
Prajapati et al., Enhancement of electromagnetically induced transparency based Rydberg-atom electrometry through population repumping, Aug. 31, 2021, 5 pages.
Prajapati et al., TV and Video Game Streaming with a Quantum Receiver: A Study on a Rydberg atom-based receiver's bandwidth and reception clarity, National Institute of Standards and Technology, May 13, 2022, 6 pages.
Renate Daschner, Addressable Rubidium vapor cells for optical and electrical read-out of Rydberg excitations, 2015, 195 pages.
Ripka et al., Rydberg atom-based radio frequency: hyperfine effects, Proc. SPIE 12016, Optical and Quantum Sensing and Precision Metrology II, 120160I, Mar. 2, 2022, 7 pages.
Simons et al., Continuous radio frequency electric-field detection through adjacent Rydberg resonance tuning, Oct. 9, 2021, 9 pages.
Simons et al., Using frequency detuning to improve the sensitivity of electric field measurements via electromagnetically induced transparency and Autler-Townes splitting in Rydberg atoms, Applied Physics Letters 108, 174101; doi: 10.1063/1.4947231, 2016, 6 pages.
Teale et al., Degenerate two-photon Rydberg atom voltage reference, AVS Quantum Sci. 4, 024403; https://doi.org/10.1116/5.0090892, Jun. 15, 2022, 6 pages.
Thaicharoen et al., Electromagnetically-induced transparency, absorption, and microwave field sensing in a Rb vapor cell with a three-color all-infrared laser system, May 27, 2019, 9 pages.
Van Ditzhuijzen et al., Simultaneous position and state measurement of Rydberg atoms, Eur. Phys. J. D 40, 13-17. DOI: 10.1140/epjd/e2006-00140-1, Jun. 21, 2006, 6 pages.
You et al., Microwave-field sensing via electromagnetically induced absorption of Rb irradiated by three-color infrared lasers, vol. 30, No. 10, Optics Express, May 9, 2022, 11 pages.
Fan et al., Atom Based RF Electric Field Sensing, Journal of Physics B: Atomic, Molecular and Optical Physics, Topical Review, published Sep. 9, 2015, pp. 1-16.
Kumar et al., Atom-Based Sensing of Weak Radio Frequency Electric Fields Using Homodyne Readout, published Feb. 20, 2017, pp. 1-10.
Kumar et al., Rydberg-Atom based Radio-Frequency Electrometry using Frequency Modulation Spectroscopy in room Temperature Vapor Cells, Optics Express, vol. 25, No. 8, Apr. 17, 2017, pp. 8625-8637.
"U.S. Appl. No. 18/202,063, Notice of Allowance mailed Mar. 19, 2024", 10 pgs.
"U.S. Appl. No. 17/940,954, Notice of Allowance mailed Jul. 21, 2023", 10 pgs.
"U.S. Appl. No. 17/940,954, 312 Amendment filed Oct. 10, 2023", 6 pgs.

* cited by examiner

Table 1 — Rydberg physics and technological innovations of the proposed effort

| QA Program Challenge | Innovations | Benefits |
|---|---|---|
| Sensitivity: Improve sensitivity, while maintaining coherence and transparency in a 1 cm³ volume | • Three-photon, Doppler-free excitation<br>• RF heterodyne allowing sub-Hz resolution of AT-splitting<br>• Transparent, conductive LO electrode design for optimized field uniformity<br>• Vapor cell and integrated optics design for 'Star' or Collinear multi-pass beam paths | Mitigates major sources of broadening for >50x sensitivity (vs two-photon excitation)<br>Enhanced readout sensitivity with negligible laser and RF crosstalk/leakage<br>Optimized room temperature sensitivity in a simplified cell structure<br>Longer beam path (recruiting more atoms) in a compact, 1 cm³ vapor cells |
| Tuning: Fast, broad, continuous, frequency tuning and hopping using simple optical control scheme. Overcome channel quantization.<br>• Sweep at 100 MHz per μs,<br>• Jump 10 quantum #'s (n) in 10 μs | • DC Stark Tuning scheme using optically transparent intra-cell electrodes<br>• Fast laser tuning using seed switching (low risk, phase 1) and fast ECDL (phase 2)<br>• Software defined Rydberg Receiver (SDR²) for orchestrated, programmable, converged RF and laser system control and channel switching | Enables receiver to meet or exceed:<br>• Rydberg state selection 0.01-40 GHz tuning<br>• 5 nanosecond switching of RF heterodyne LO field frequency and DC bias E-field<br>• Coupling laser wavelength switching for Δn> 10 at few-μs-timescales<br>• Fast ECDL reduces laser overhead to enable BAA2 miniaturization and transition<br>• Extensible, converged RF SDR² ready to support BAA2 waveform development |
| Waveform Compatibility: Extend signal processing capability from single frequency to multi-spectral and higher power signals. Operate under complex wideband clutter. Develop model for arbitrary input and create new waveforms. | • RF heterodyne detection signal at intermediate frequency<br>• QA BAA1 signal receive demonstrations implemented using SDR², including a Link16 demo for the FHSS waveform<br>• Adaptive detection scheme for both weak and strong signal detection<br>• Connection to other RF systems | • Heterodyne scheme inherently filters out-of-band clutter<br>• Yields bandwidth x10 over state-of-the-art<br>• Library of mission waveforms ready to port into SDR² for BAA2 experiments<br>• Enables (and simplifies) waveform demos and provides a path to BAA2 demos |
| Looking Towards BAA2 Sensor array/advanced RF reception: Create element scalable to array, supporting Angle of Arrival (AOA) and phase measurements without complications like cross-element interference. Individually addressable and programmable elements. | • Phase sensitive RF heterodyne detection<br>• Cell design supports batch fabrication<br>• Micro-optic distribution for dressing and coupling laser power recycling<br>• DC/RF crosstalk reduction through modeling<br>• SDR² "receiver channel" scalability<br>• Rydberg excitation using COTS semi-conductor and telecom band fiber lasers | • Angle of Arrival detection scheme native to phase sensitive field sensing<br>• Tangible path to 100-element array in BAA2<br>• Feasible path to low-SWAP controller (laser/electronics support system)<br>• Receiver multiplexing in support of scalable data rate up to 1000 Mbit/s:<br>$R_{data} \propto N_{ch} \times 10$ Mbit/s |

FIG. 5

Table 2

| Technical Metric Challenge | | Unit | Phase 1 (12 mo.) Signal Analyzer | Phase 2 (12 mo.) Advanced Receiver | Phase 2 Frequency | Sensitivity (dBI/Hz) |
|---|---|---|---|---|---|---|
| TC1 | Sensitivity | dBI/Hz | -145 | See right ⇒ | 40 GHz | -150 |
| | Coherence Time | ns | >100 | >100 | 10 GHz | -165 |
| | Vapor Cell Transparency | % | -- | 99 | 1 GHz | -165 |
| | Max Intensity | dBI | -- | 50 | 100 MHz | -145 |
| | Sensor Head Element Size | cm³ | 1 | 1 | 10 MHz | -115 |
| TC2 | Continuous Frequency Coverage | GHz | 1.7 to 2.2 | 0.01 to 40 | | |
| | Channel Switching Speed | µs | 1000 | 10 | | |
| | Channel Switching Span | GHz or # | 1 | 10 | | |
| | Scan Speed | MHz/µs | 1 [6] | 100 | | |
| TC4 | Signal Receive Demonstrations | | Analyzer Scan | GPS, DTV, FHSS | | |
| | Data Rate | Mbit/s | 1 | 10 | | |

FIG. 7

Table 3

| Dressed State | $\lambda_P$ (nm) | $\lambda_D$ (nm) | $\lambda_C$ (nm) | Energy Mismatch, $\Delta f$ (THz) |
|---|---|---|---|---|
| Cs 7D | 852.3 | 697.5 | 1881.4→1896.6 | 81.3 |
| Cs 8D | 852.3 | 621.5 | 2808.1→2840.4 | 25.2 |

FIG. 8

Table 4: Simulated Sensitivity

| Frequency (GHz) | TC1 Goal (dBI) | STEARS (dBI) |
|---|---|---|
| 40 | -150 | -167 |
| 10 | -165 | -171 |
| 1 | -165 | -171 |
| 0.1 | -145 | -153 |
| 0.01 | -115 | -147 |

FIG. 13

Table 5. Beam Geometries Satisfying Phase 2 Sensitivity Metric

| Beam Geometry | # of passes | Interaction Volume ($mm^3$) | Dressing Power (mW) | Coupling Power* (W) | Probe Power (µW) |
|---|---|---|---|---|---|
| Star | 1 | 05 | 85 | 0.4 to 2.0 | 7 |
| Collinear | 8 | 22 | 1.7 | 0.4 to 2.0 | 10 |

* Coupling power tuned for optimal sensitivity based on target state

FIG. 14

Table 6. Baseline Cell Dimensions

| Dimension | Internal | External |
|---|---|---|
| H (mm) | 7 | 11 |
| W (mm) | 10 | 12 |
| D (mm) | 5 | 7 |
| Volume (cm$^3$) | 0.35 | 0.92 |

8 beam passes × 7 mm = 56 mm path length

FIG. 16

Table 7. Cell Dielectric Properties & Transmission

| Material | $E'$ | $E''$ | $\tan\delta$ | T |
|---|---|---|---|---|
| Quartz | 3.8 | 7.6E-4 | 2E-4 | 99.9% |
| Pyrex | 5.3 | 1.2E-2 | 2.3E-3 | 99.8% |
| Aluminosilicate | 6 | 2.2E-2 | 3.7E-3 | 99.5% |

While quartz has the lowest RF loss, it has elevated gas permeation. Pyrex or aluminosilicate glasses will be used.

FIG. 18

Table 8. DC Bias E-Field and RF Heterodyne LO Electrode Design Objectives and Approach

| Electrode Design Objective | Electrode Design Approach |
|---|---|
| Electrode shape to maximize RF LO and DC bias field uniformity | Dual electrodes on opposing vapor cell faces with balanced feed to increase uniformity (Fig. 11). Explore patterned electrodes like those used in magnetic resonance imaging for enhanced uniformity. |
| Electrode material properties for laser transparency, dual polarization detection, and reduced incident RF scattering | Use conductive, transparent thin films (e.g., ITO), already tested in vapor cell [30]. High resistance of more than 1 k-Ohm is lossy but allows both polarizations to enter the sensing volume and results in low RCS. Such films are transparent to our laser wavelengths, allowing increased shape and pattern design flexibility. |
| Electrode placement supports multiple ground plane and plat-form configurations | Electrode placement tailored to typical expected platform installations: 1) incident RF parallel to ground plane, electrodes also parallel to ground plane, 2) incident RF perpendicular to ground plane, electrodes parallel to incident RF, 3) incident RF perpendicular to ground plane at a leading edge of a chassis/wing, electrodes parallel to incident RF |
| Reduce standing wave effects | Install lossy foam between vapor cell and ground plane to absorb reflected incident power, eliminating standing wave nulls. |
| Minimize LO RF, DC bias field, laser, and IR emission from aperture element | DC Bias/RF Energy density is already small relative to electromagnetic environment. Cancel residual LO RF leaks in an array configuration (work with TA2) by introducing heterodyne RF phase shifts across array elements. Dielectric tapering around cell to concentrate fields in known areas and increase internal field uniformity. |

FIG. 20

Table 9. Micro-Optics System Innovations

| Innovation | Benefit |
|---|---|
| Shaped/structured fiber tips [25] | Extremely compact beam collimation & profile shaping |
| Linearly polarized Beam steering | Ultra-low distortion polarization management |
| Super-achromatic waveplates [40] | All excitation wavelengths highly circularly polarized |
| Compact folded beam path | High coupling and dressing intensity; large interaction volume within the vapor cell |
| Lithographically fabricated micro-optic bench | Precisely aligned mm-sized optics, assembled by pick-and-place |

FIG. 22

Table 10

| Loss | Laser Wavelength | | |
|---|---|---|---|
| | Probe | Coupling | Dressing |
| Absorption (electrodes) | 7.7% | 7.7% | 21.6% |
| Reflective loss* | 7.8% | 7.8% | 7.8% |
| Depolarization | 2.8% | 2.8% | 2.8% |
| End to end coupling loss | 5.0% | 5.0% | 5.0% |
| Total loss | 21.4% | 21.4% | 33.3% |
| Total transmission | 78.6% | 78.6% | 66.7% |

*Includes dichroic beam splitter loss

FIG. 27

Table 11: Preliminary allocation of Hedgehog resources (ECDL config) to support a single sensor element. Scaling to an array, probe and dressing resources remain fixed. In this configuration, one Hedgehog (16 ADCs, 16 DACs, 8 MATRICs ins/outs) supports the Phase 3, 4-element array.

| RF and Laser functions | RFSOC | | MATRICs | |
|---|---|---|---|---|
| | ADC | DAC | in | out |
| Probe laser (1 per array) | 1 | 1 | | |
| Dressing laser (1 per array) | 1 | 1 | | |
| Phase 1 coupling laser with < 2 GHz tuning | 1 | 2 | | |
| Phase 2 coupling laser (ECDL) with > 2 GHz tuning | 1 | 1 | 1 | 1 |
| Sensor Head LO / DC | | 2 | 1 | 1 |
| Photodetector | 1 | | | |

FIG. 29A

Table 12: SDR$^2$ delivers extensible, scalable capability towards an array system in BAA2.

| Feature | Phase 1 | Phase 2 | BAA2 |
|---|---|---|---|
| MATRICs | Four V3s | Four V4s | Four V5s (or more) |
| Channels | 8 TX/RX | 8 TX/RX | 8 TX/RX (or more) |
| Addressable frequency | 0.5 - 6 GHz | 0.01 - 40* GHz | 0.01 - 50 GHz (on small board) |
| Signal Receive Demos | Analyzer Scan | GPS DTV FHSS | Novel TA2 waveforms, AOA, signal classification, geo, RadioMap, etc. |
| Interfaces | 100 GbE, V49.2 data and ctrl, DisplayPort, External Clock, GPIO, USB, UART | | |

*38 GHz on board, 40 GHz with lab A WG for demos.

FIG. 29B

Table 13: Laser technology selection suited to QA Technical Challenges; Technical baseline = COTS lasers

| Laser | Wavelength | Baseline approach | Linewidth | Output power | Alternates evaluated in Phase 1 |
|---|---|---|---|---|---|
| Probe | 852nm | External cavity diode laser (ECDL) | Free-running: <100 kHz Locked: <5 kHz | >50 mW | Other COTS ECDL variants (OEwaves, etc) |
| Dressing | 697.5nm | Ti:Sapphire (Ti:Saph) | <20 kHz | >1 W | SFG, ECDL (low power), COTS TA |
| Coupling | 1881.5nm 1895.5nm 1896.6nm | 3 Thulium-doped fiber lasers (TDFL) + amplifier (TDFA) | <10 kHz | >2 W | FAST ECDL(s) + TDFA |

FIG. 31

Table 14: Estimated values for key metrics based on baseline laser system architecture in each phase

| Phase | Coupling laser approach | Continuous frequency coverage [GHz] | Channel switching speed [μs] | Channel switching span [GHz, Δn] | Scan speed [MHz/μs] |
|---|---|---|---|---|---|
| 1 | Seed switching (2 seeds) | 0.5 to 2.2 | 0.05 | ≥1.5, Δn=1 | >100 |
| 2 | FAST ECDL or Seed switching (3 seeds) | 0.01 to 40 | 3.8 or 0.05 | up to 39.99, Δn=29 | >100 |

Table 15: STEARS system advantages enabling QA program success

| Metric | Unit | Phase 1 | Phase 2 | STEARS System Advantage |
|---|---|---|---|---|
| Sensitivity | dBI/Hz | -145 | See Table 2 | • 3-photon excitation sharpens EIT resonance<br>• RF Heterodyne allows sub-Hz resolution of AT-splitting |
| Coherence Time | ns | >100 | >100 | • Complete model of decoherence processes<br>• Reduction of resonance broadening mechanisms |
| Vapor Cell Transparency | % | -- | 99 | • Vapor cell material selection<br>• RF and optical transparent conductive electrodes |
| Max Intensity | dBI | -- | 50 | • High vapor cell transparency<br>• RF signal strength tracking and processing |
| Sensor Head Element Size | cm³ | 1 | 1 | • Wafer level vapor cell bonding expertise<br>• Micro-optic light delivery assembly |
| Continuous Frequency Coverage | GHz | 1.7 to 2.2 | 0.01 to 40 | • DC Stark tuning of Rydberg energy levels for continuous scanning of sensor RF resonance<br>• Tunable laser system tracks optimal excitation λ |
| Channel Switching Speed | μs | 1000 | 10 | • Rapidly tunable EOD+ECDL coupling laser<br>• SDR² converged RF LO + Laser control |
| Channel Switching Span | GHz or # | 1 | 10 | • Rydberg state selection; calibrated stark tuning<br>• Highly tunable laser system |
| Scan Speed | MHz/μs | 1 [6] | 100 | • Rapidly tunable EOD+ECDL coupling laser<br>• SDR² orchestrated laser tuning |
| Signal Receive Demonstrations |  | Analyzer Scan | GPS, DTV, FHSS | • SDR² converged RF LO + Laser control<br>• Detection schemes guided by advanced signal models |
| Data Rate | Mbit/s | 1 | 10 | • Model guided laser and RF LO parameters optimize sensitivity and responsiveness to modulated RF fields |

FIG. 38

RADIO-FREQUENCY RECEIVER PUMPED TO HIGH-AZIMUTHAL RYDBERG STATES

CROSS REFERENCE TO OTHER APPLICATIONS

This application is a continuation of U.S. patent application Ser. No. 17/940,954 entitled RADIO-FREQUENCY RECEIVER PUMPED TO HIGH-AZIMUTHAL RYDBERG STATES filed Sep. 8, 2022, which claims priority to U.S. Provisional Patent Application No. 63/242,850 entitled STARK-TUNED ELEMENT FOR ARRAYS OF RYDBERG SENSORS filed Sep. 10, 2021, both of which are incorporated herein by reference for all purposes.

This invention was made with government support under grant number DARPA is HR001121C0152 awarded by the Defense Advanced Research Projects Agency (DARPA). The government has certain rights in the invention.

BACKGROUND

Classical radio-frequency (RF) receivers employ antennas that scale with the longest wavelengths to be detected. This scaling adversely affects the size, weight, and power (SWAP) requirements of long-band and wideband receivers, making them unsuitable for on-board navigation and other applications. In addition, the sensitivity of such classic RF receivers can be insufficient for some purposes.

Receivers using quantum technologies have provided greater sensitivity without the scaling in size when longer RF wavelengths are involved. Such quantum systems can use a "probe" laser to excite ground state atoms to excited states and a "coupling" laser to transit atoms from the excited states to a first Rydberg state. Incident RF wavefronts of a target frequency can cause atoms to transition between the first Rydberg state and a second Rydberg state. This Rydberg state coupling can be detected by monitoring the intensity of the probe beam, e.g., using a photodetector. The photodetector output can be processed to extract information from the RF wavefront. While such quantum receivers offer substantial improvements over classical receivers, greater performance, e.g., sensitivity to low intensity RF wavefronts and wideband tunability, are desired.

BRIEF DESCRIPTION OF THE DRAWINGS

In the following brief descriptions, values in parentheses following a FIGURE number identify a corresponding figure number (e.g., F3=FIG. 3) or table number (e.g., T1=Table 1) in the provisional application based on which a benefit of priority is claimed.

FIG. 5 (T1) is a table of technological innovations implemented in embodiments of the present invention.

FIG. 7 (T2) is a table of metrics applicable to the receiver of FIG. 1.

FIG. 8 (T3) is a table of characteristics of a pair of three-photon excitation schemes.

FIG. 13 (T4) is a table of simulated photon-shot-noise-limited detection sensitivity for a pair of embodiments.

FIG. 14 (T5) is a table of beam geometries satisfying certain sensitivity metrics.

FIG. 16 (T6) is a table of baseline cell dimensions.

FIG. 18 (T7) is a table of the dielectric properties and transmission characteristics of cell wall materials used in various embodiments.

FIG. 20 (T8) is a table of DC Bias E-field and RF Heterodyne LO electrode design objectives for electric fields applied by the transparent electrodes of FIG. 19.

FIG. 22 (T9) is a table of micro-optics system innovations incorporated in vapor cells used in various embodiments of the invention.

FIG. 27 (T10) is a table of parameters associated with the probe, coupling and dressing excitation beams.

FIG. 29A (T11) indicates hardware resource allocations to various receiver components.

FIG. 29B (T12) shows capabilities for different embodiments of the invention.

FIG. 31 (T13) is a table showing parameter values for probe, dressing, and coupling lasers of the receiver of FIG. 1.

FIG. 34 (T14) is a table of estimated values for alternative laser architectures for receivers in accordance with the present invention.

DETAILED DESCRIPTION

The present invention provides an RF receiver that pumps quantum particles to high-azimuthal Rydberg states to detect RF signals/wavefronts with frequencies at or near resonance with a transition between the high-azimuthal Rydberg state and a second Rydberg state (which can be a high or a low azimuthal Rydberg state). In general, there are more high-azimuthal Rydberg states than low-azimuthal Rydberg states. Thus, using high-azimuthal Rydberg states provides a wider variety of transitions between Rydberg states that can match RF frequencies of interest. For receivers that use Stark shifts for fine tuning, the greater variety means that lower maximum voltages are required for continuous tuning, which, in turn, makes it easier to minimize exposure to the Inglis-Teller limit (which would otherwise interfere with continuous tuning).

The lasers required to pump atoms to a high-azimuthal Rydberg state can include not only a probe beam and a coupling beam, but also one or more dressing beams. For a transition between a ground state and a Rydberg state, the inclusion of a dressing beam decreases the maximum frequency and energy of laser beams required to effect the transition. Moreover, two laser beams (e.g., dressing and coupling) can be counter-propagated against a third (e.g., probe) beam to offset Doppler effects that would otherwise result in wider linewidths and lower sensitivity. Accordingly, there are several advantages of an RF receiver that uses high-azimuthal Rydberg states over a receiver than is limited to laser pumping to low azimuthal Rydberg states.

An electron in an atom can be characterized using four quantum numbers: a principal quantum number (n), an azimuthal quantum number ($\ell$) that corresponds to angular momentum, a magnetic quantum number ($m_\ell$), and a spin quantum number ($m_s$). Herein, Rydberg states are states with high principal numbers n, including principle numbers in the range $30 \leq n \leq 70$ of interest herein. Herein, in the case of a high-azimuthal state, the azimuthal quantum number $\ell$ is an integer greater than or equal to three; stated otherwise $\ell \geq 3$. On the other hand, $\ell = 0$, $\ell = 1$, and $\ell = 2$, represent low azimuthal states. In some contexts, azimuthal quantum numbers are expressed as letters, for example, S, P, D, F, G, H, I, K, L, and M correspond respectively to the following numerical values of $\ell$: 0, 1, 2, 3, 4, 5, 6, 7, 8, and 9. Thus, S, P, D represent low-azimuthal states, while F, G, H, I, K, L and M represent high azimuthal states (aka, high angular momentum states).

Figure 1:
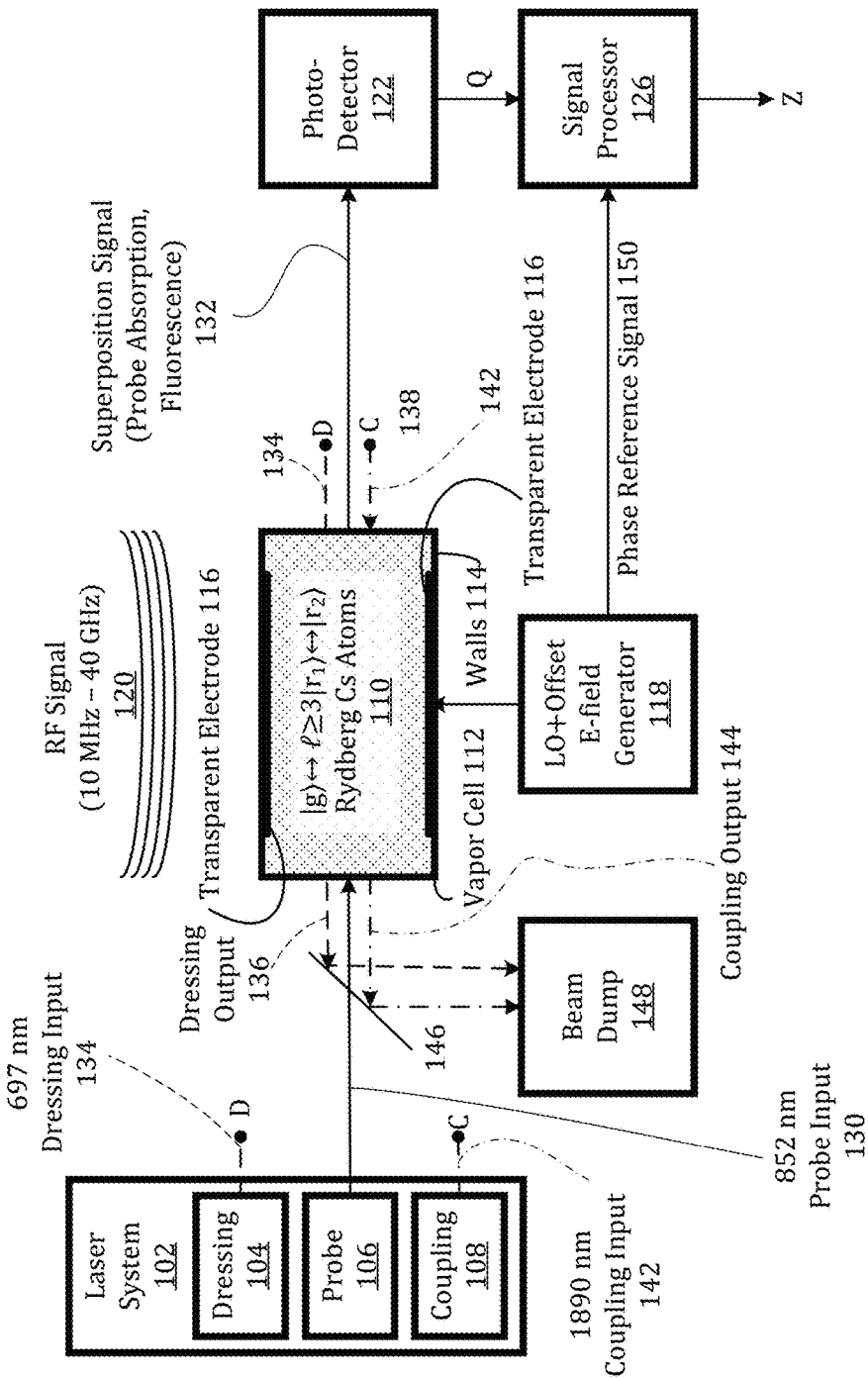
FIG. 1 is a schematic diagram of a Rydberg-based radio-frequency (RF) receiver.

For example, a high-azimuthal Rydberg state RF receiver 100 includes a laser system 102 with a dressing laser 104, a probe laser 106, and a coupling laser 108, as shown in FIG. 1. These lasers are used to transition cesium 133 ($^{133}$Cs) atoms 110 in a vapor cell 112 from a ground state to a first Rydberg state. As indicated for the scenario represented in FIG. 2, the probe laser outputs an 852 nanometers (nm) probe beam that transitions Cs atoms from a $6S_{1/2}$ ground-state $|g\rangle$ to an $6P_{3/2}$ excited state $|e\rangle$. The dressing laser outputs a 697 nm dressing beam that transitions atoms in the $6P_{3/2}$ excited state $|e\rangle$ to a $7D_{5/2}$ dressed state $|d\rangle$. The coupling laser transmits an 1890 nm coupling beam that transitions from the dressed state to a first Rydberg state $|r_1\rangle$ belonging to a class of $nF_{7/2}$ high-azimuthal Rydberg states, where n is a principle number of a Rydberg state and $30 \leq n \leq 70$. The value of principle number n is selected based on the selected target RF frequency to be detected. The exact wavelength of the coupling beam can vary as a function of principle number n, but for $30 \leq n \leq 70$, the coupling wavelength within $1890 \pm 6$ nm. When the probe, dressing, and coupling beams are all active, the atoms end up in a superposition of the ground and first Rydberg states.

Probe laser 106 outputs a probe beam that is represented in FIG. 1 by a probe input beam segment 130 that is input to vapor cell 112 from the left, and a probe output beam segment 132 that exits vacuum cell 112 on its way to photodetector 122. Dressing laser 104 outputs a dressing beam represented by a dressing beam input segment 134 that is input to vapor cell 122 (via node D) from the right and a dressing beam output segment 136 that is output from vapor cell 112 and reflected by dichroic mirror 146 to beam dump 148. Coupling laser 108 outputs a coupling beam that is represented by a coupling input segment 142 that is input (via node C) to vapor cell 112 from the right and coupling output segment 144 that exits vapor cell 122 and is redirected by dichroic mirror 146 to be dumped at beam dump 148.

Not all laser beams input segments enter vapor cell 112 from the same end. Instead, the beams enter from opposite ends to offset set some of the Doppler shifts caused by the beams. If the dressing beam were omitted, a higher frequency, shorter wavelength probe beam would be required; even if the probe and coupling beams were counter-propagated, the difference frequency would be large resulting in more band broadening and greater noise due to Doppler shifts. Also, if only probe and coupling beams were used, one would not have access to the F-G transitions, so the inclusion of the dressing beam increases the variety of Rydberg states available to match target RF frequencies.

Vapor cell 112 (FIG. 1) includes six glass walls 114 contact bonded to define a rectangular parallelepiped vacuum boundary. The glass material is selected to be transparent to the laser and RF frequencies of interest. Transparent electrodes 116, e.g., of indium titanium oxide (ITO) are formed on the interior surfaces of opposing walls 114. An electric-field generator 118 is electrically coupled to electrodes 116 to control the electric field within vapor cell 112.

Generator 118 outputs an e-field drive signal that has both constant (DC) and time-varying (AC) components. The DC component is used for fine tuning based on the DC Stark effect. The AC component is used to down-convert an incident RF signal to beat frequency that can be demodulated and decoded by a signal processor.

Figure 2:
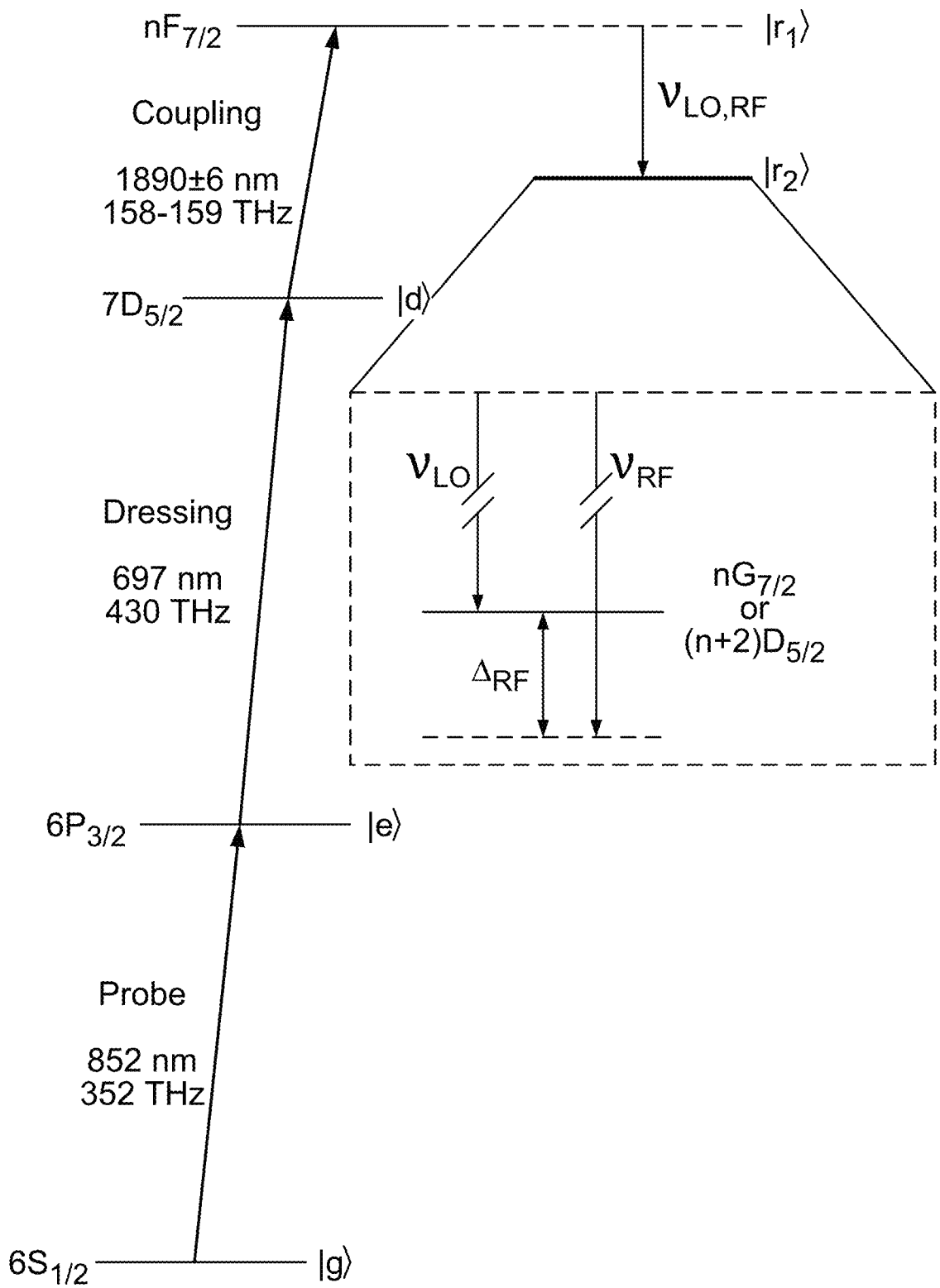
FIG. 2 (F3) is a diagram showing a three-photon excitation scheme used in the receiver of FIG. 1.

The time-varying component is provided by a local oscillator (LO) that is adjusted so that its frequency $v_{LO}$ differs from the frequency $v_{RF}$ of the target RF signal 120 by a predetermined difference or "beat" frequency $\Delta_{RF}$, as indicated in FIG. 2. The constant component of the e-field control signal is adjusted to fine tune the Rydberg transition between the first Rydberg state $|r_1\rangle$ and a second Rydberg state $|r_2\rangle$ so that the resonance frequency for the transition matches the local oscillator frequency. In the absence of an incident RF signal at the target RF frequency $v_{RF}$, the internal electric field oscillating at the local oscillator frequency $v_{LO}$ induces transitions between Rydberg states $|r_1\rangle$ and $|r_2\rangle$, modifying the superposition of the ground state and the first Rydberg state to a 3-way superposition among the ground state $|g\rangle$, the first Rydberg state $|r_1\rangle$, and the second Rydberg state $|r_2\rangle$. The effect on the superposition shows up as a change in the probe beam output intensity.

An incident RF signal at the target frequency $v_{RF}$ interferes with the e-field oscillations causing the distribution of atoms between the $|r_1\rangle$ and $|r_2\rangle$ Rydberg states to oscillate at the beat frequency $\Delta_{RF}$. This oscillation in the distribution of atoms is represented in the probe output signal as an oscillation of the probe beam output intensity at the beat frequency $\Delta_{RF}$ and, thus, in the photodetector output signal Q. The photodetector output signal Q can then be demodulated and otherwise processed by signal processor 126 to yield an output corresponding to the content of incident RF signal 120.

Under the influence of the electric field at the local oscillator frequency $v_{LO}$, the distribution of atoms among the ground state $|g\rangle$ the $|r_1\rangle$ AND $|r_2\rangle$ Rydberg states oscillates at the beat frequency $\Delta_{RF}$. and thus, the intensity of probe output 132 varies that the local oscillator frequency $v_{LO}$. Upon reception, RF signal 120 alternatively interferes constructively and destructively with the e-field oscillations to produce a difference frequency equal to the pre-selected difference frequency $\Delta_{RF}$. This beat frequency $\Delta_{RF}$ is imposed on the intensity of probe-beam output segment 132 as detected by photodetector 122. The photodetector output varies at the beat frequency and can be demodulated and decoded to yield an output z suitable for the intended application. E-field generator 118 outputs a phase reference signal 150 to signal processor 126 to allow it to phase lock to the incoming filtered signal.

In an alternative embodiment, fluorescence resulting from decay of atoms for the first Rydberg state to the ground state is detected in lieu of or in addition to probe absorption. To generalize, signal 132 is termed a "superposition signal" as it tracks the percentage of quantum particles in the ground state at any given time. In the absence of an incident RF signal at the target RF frequency, this percentage is constant; in the presence of the RF signal at the target RF frequency, the superposition signal oscillates at the beat frequency due to mixing of the RF signal and the E-field oscillations.

Figure 3:
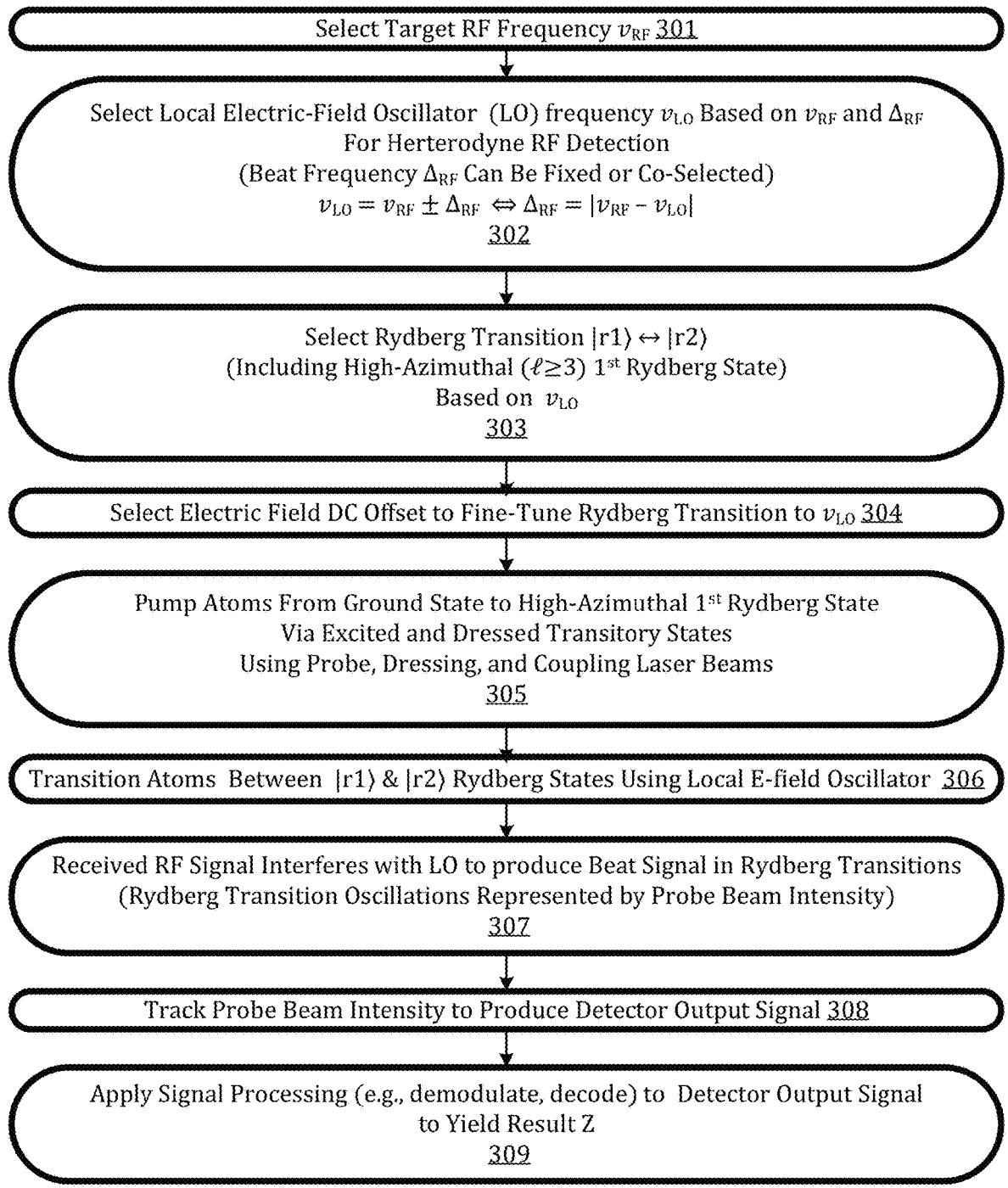
FIG. 3 is a flow chart of a Rydberg-based radio-frequency (RF) receiver process implementable in the receiver of FIG. 1 and in other receivers.

A high-azimuthal Rydberg RF receiver process 300, flowcharted in FIG. 3, includes selecting a target RF frequency $v_{RF}$ at 301. This target frequency can be selected, for example, from a wideband range of 10 megahertz (MHz) to 40 gigahertz (GHz). Process 300 can be iterated, and different target RF frequencies can be selected for different iterations.

A local oscillator frequency $v_{LO}$ is determined, at 302, based on the target RF frequency $v_{RF}$. More specifically, $v_{LO}=v_{RF}\pm\Delta_{RF}$, where $\Delta_{RF}$ is a beat frequency, e.g., in the 10-20 MHz range, selected for use in a heterodyne detection scheme. In some embodiments, beat frequency $\Delta_{RF}$ is fixed and independent of the target RF frequency $v_{RF}$ and of the local oscillator frequency $v_{LO}$, while in others, the beat frequency $\Delta_{RF}$ is selected along with the local oscillator frequency $v_{LO}$ based on the target RF frequency $v_{RF}$.

A Rydberg transition is selected at 303 with resonance at or near the selected local oscillator frequency $v_{LO}$. This requires specifying a first Rydberg state with a high ($\ell \geq 3$) azimuthal quantum number. For example, in FIG. 3, the F Rydberg state $|r_1\rangle = nF_{7/2}$ corresponds to an azimuthal quantum number $\ell = 3$. In addition, a second Rydberg state $|r_2\rangle$ is selected, which can but need not have a high azimuthal quantum number. The example of FIG. 3 presents alternative second Rydberg states, one (nG7/2) which has a high azimuthal quantum number $\ell = 4$, and one (n+2) $D_{5/2}$ that has a low azimuthal quantum number $\ell = 2$.

The selection of Rydberg states can be constrained by the laser wavelengths available to pump ground state quantum particles to the first Rydberg state $|r_1\rangle$. One practical example of laser wavelengths is presented in FIG. 2: The probe, dressing, and coupling wavelengths are 852 nm, 697 nm, and 1890 nm, with the coupling wavelength being tunable ±6 nm. An alternative system uses 852 nm, 921 nm, and 1140±3 nm respectively for the probe, dressing and coupling beams.

A DC (constant voltage) offset is selected at 304. The DC offset can be zero volts in the event that the local oscillator frequency $v_{LO}$ is resonant with the selected Rydberg transition. Otherwise, a DC offset is used to apply a DC Stark shift to fine tune the Rydberg transition resonance to the local oscillator frequency $v_{LO}$. If the available Rydberg transition resonances are widely spaces, DC offsets in excess of 12 volts can be required, but risk being ineffectual due to the Inglis-Teller limit. By providing for high azimuthal Rydberg states, the present invention provides a greater selection of Rydberg transitions, which allows their resonances to be more closely spaced so lower maximum DC offset voltages are required, reducing risk due to the Inglis-Teller limit.

Quantum particles, e.g., cesium 133 or rubidium 87 atoms, are pumped, at 305, from a ground state $|g\rangle$ to the first Rydberg stat $|r_1\rangle$ via transitions through an excited and dressing transitory states $|e\rangle$ and $|d\rangle$. As a result, the quantum particles are in a superposition of the ground state $|g\rangle$ and the first Rydberg state $|r_1\rangle$. As quantum particles are pumped to the first Rydberg state $|r_1\rangle$, others return from the first Rydberg state $|r_1\rangle$ to the ground state $|r_1\rangle$ through stimulated or spontaneous decay. This ensures a constant superposition percentage is available for pumping; this percentage is represented by the amount of the probe beam absorbed as ground state quantum particles absorb probe photons. Thus, the distribution of quantum particles between the ground state $|g\rangle$ and the first Rydberg state can be tracked by monitoring the probe output from the cell containing the quantum particles. Alternatively, fluorescence due to decay can be indicate the percentage of superposition associated with the ground state $|g\rangle$.

Once an offset oscillating electric field is activated, at 306, in the cell at the local oscillator frequency $v_{LO}$, quantum particles can transition back and forth between the first Rydberg state $|r_1\rangle$ and the second Rydberg state $|r_2\rangle$. This access to the second Rydberg state competes with the return path from the first Rydberg state to the ground state. In the absence of an incident RF wavefront at frequency $v_{LO}$, this reduction results in lower probe beam absorption and/or lower fluorescence. At this point the quantum particles are in a three-way superposition among the ground state $|g\rangle$, first Rydberg state $|r_1\rangle$, and second Rydberg state $|r_2\rangle$.

An RF wavefront at the target RF frequency received at 307 interferes with the electric field oscillations at the local oscillator frequency $v_{LO}$, to provide oscillations of constructive and destructive at the beat frequency $\Delta_{RF}$. During half cycles of constructive interference, the coupling of the first Rydberg state $|r_1\rangle$ to the second Rydberg state $|r_2\rangle$ is maximal, resulting in a lowered probe beam absorption and/or fluorescence intensity. During half cycles of destructive interference, coupling between the Rydberg states is minimal and probe beam absorption and/or fluorescence intensity are maximal.

The oscillations at the beat frequency $\Delta_{RF}$ can be tracked, at 308, by a photodetector, resulting in a photodetector output that oscillates at the beat frequency. A signal processor can process (e.g., demodulate and decode) the photodetector (e.g., to access data carried by the incident RF wavefront) at 309 to yield a result Z.

Operational platforms require freedom of action in contested environments, including freedom to maneuver across the electromagnetic spectrum. Capabilities based on electromagnetic principles, like communications and radar depend on antennas as a key component to transmit and receive RF waves. Furthermore, the spectral properties of antennas depend on their size, coupling platform integration form factors with feasible applications, limiting their potential.

Figure 4:
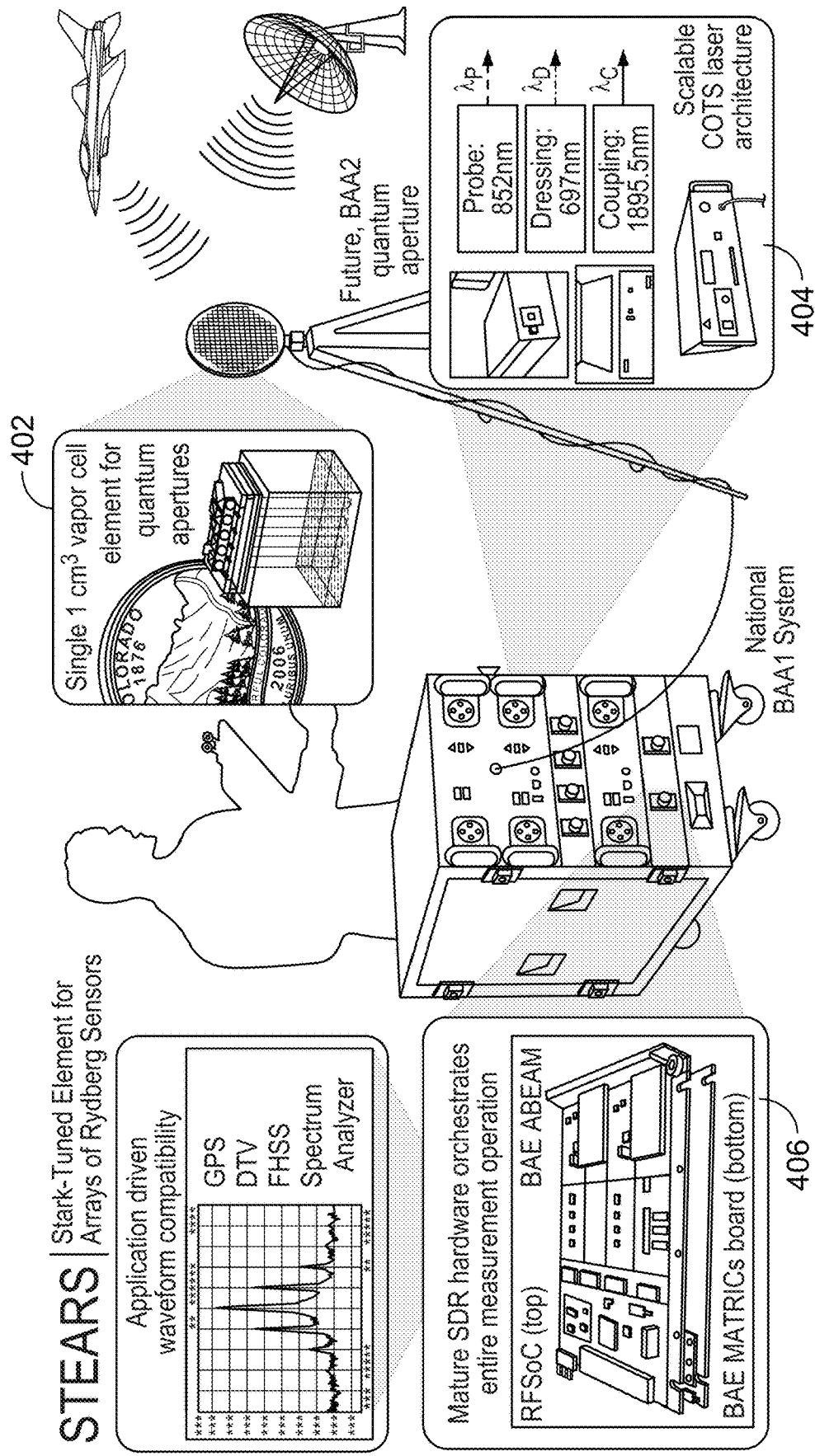
FIG. 4 (F1) is an image indicating hardware used in the receiver of FIG. 1.
Figure 6:
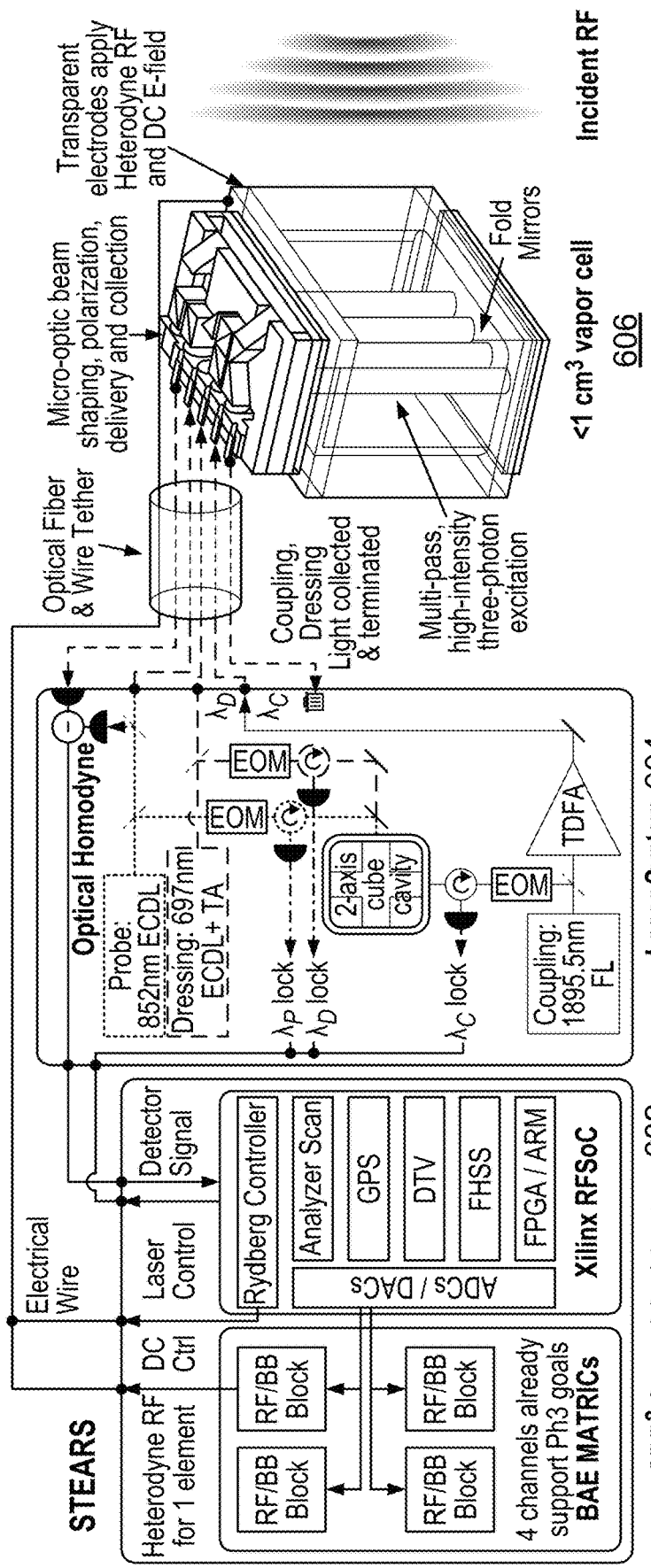
FIG. 6 (F2) is a diagram of a functional architecture of the receiver of FIG. 1.

A complete Stark-Tuned Element for Arrays of Rydberg Sensors (STEARS) system 400 capable of receiving low intensity, modulated RF signals across a spectral range spanning 10 MHz to 40 GHz is shown in FIG. 4. This portable system includes a 1 cm³ room-temperature atomic vapor cell 402, with integrated Micro-optic light delivery, tethered to rack mounted laser and control architecture 404. System operation is orchestrated by mature software defined radio (SDR) architecture 406 and high-functionality FPGA for integrated laser and sensor control. Hardware selection and sensor head design practices support scalability.

The Stark Tuned Element for Arrays of Rydberg Sensors (STEARS) system incorporates sensor physics and technologies that readily scale to a fieldable arrayed sensor system that enhance situational awareness and freedom of action. STEARS uses coherent, electromagnetically induced transparency (EIT) techniques to detect minute changes in probe laser transmission from Autler-Townes (AT) splitting caused by incident radio frequency (RF) fields. Crucially, sensor physics leverages quantum mechanics to detect weak signals rather than solid-state physics, which currently limits existing classical apertures.

The STEARS sensor achieves shot noise limited detection at or below the target level of −165 dBI/Hz (~1 nV/cm/√Hz), exceeding the fundamental limits of classical antennas. Limitations of traditional EIT schemes are overcome by combining multiple advanced techniques. First, a three-photon EIT scheme with dressed state preparation reduces Doppler-broadening, resulting in a 1 MHz EIT linewidth, ~2× narrower than the most sensitive two-photon approach to date. Second, an atom analog of heterodyne detection used in classical RF receiver systems is implemented to realize phase sensitive detection of the incident field. Combined, these methods yield ~100× improved read-out sensitivity over current state-of-the-art.

The STEARS system performs Rydberg electrometry within a <1 cm³ sensor head, which is tethered to control instrumentation by only fibers and wires. The sensor head includes a vapor cell and integrated micro-optic system that shapes, polarizes, and steers excitation light though the vapor cell, maximizing the atom interrogation volume. Transparent, conductive films patterned on internal faces of the vapor cell windows enable applied DC and RF fields to the atoms, facilitating Stark-tuning of the Rydberg resonance and phase-sensitive RF heterodyne detection. The all-glass vapor cell is contact-bonded to eliminate lossy materials, such as the silicon used in anodically bonded cells, to achieve >99% RF-transparency and enable high field (>50 dBI) survivability.

The Rydberg electrometer sensor head is paired with existing, state-of-the-art software defined radio (SDR) technology, functionalizing the sensor as a full-fledged receiver capable of operating over a spectral range of 10 MHz-40 GHz. Continuous, rapid tuning of the Rydberg resonance spanning ~30 principal quantum numbers is achieved by a cavity stabilized, narrow linewidth laser system with electro-optic modulation in conjunction with the intra-cell DC electric field. The SDR back end is capable of demodulating data encoded on the incident RF Field, and Rydberg coupling Rabi frequencies of 10-20 MHz enable data rates exceeding 10 Mbits/s.

Sensor fabrication methods and hardware development tasks support extensibility from single sensing element to sensor array configurations. The vapor cell is designed for batch fabrication, and the micro-optic system is built primarily from elements manufactured at the wafer-level and assembled via automated pick and place techniques. The SDR hardware provides for BAA1 flexibility and sets up BAA2 packaging and future co-use with standard RF systems and envisioned future converged RF systems. An initial analysis of Angle of Arrival (AoA) detection finds that an array of STEARS sensors supports <1° AoA resolution in K and Ka bands.

The system employs three-photon, Doppler-free excitation so as to mitigate major sources of broadening to achieve >50× sensitivity (vs two-photon excitation). RF heterodyne allowing sub-Hz resolution of AT splitting provides enhanced readout sensitivity with negligible laser and RF crosstalk/leakage. Transparent, conductive LO electrode design for optimized field uniformity to achieve enhanced readout sensitivity with negligible laser and RF crosstalk/leakage. Vapor cell and integrated optics design for 'star' or collinear multi-pass beam paths to achieve optimized room temperature sensitivity in simplified cell structures and longer beam path (recruiting more atoms) in a compact 1 cm³ vapor cell.

The present system employs a DC Stark Tuning scheme using optically transparent intra-cell electrodes, fast laser tuning using EDCL or seed switching, and Software-Defined Rydberg Receiver (SDR²) for orchestrated, programmable, converged RF and laser system control and channel switching to achieve Rydberg state selection 0.01-40 GHz tuning, 5 nanosecond switching of RF heterodyne LO field frequency and DC bias E-field, coupling laser wavelength switching for $\Delta n>10$ at few-µs-timescales and reduced laser overhead to enable BAA2 miniaturization and transition.

STEARS system 400 achieves performance goals (see Table 1 in FIG. 5) by implementing multiple sensitivity enhancing and capability broadening techniques in Rydberg-atom RF electrometry. These advanced techniques are combined with highly miniaturized vapor cell and micro-optic technology, an innovative laser architecture that achieves µs-timescale switching between excitation wavelengths, and an integrated software-defined radio controller to orchestrate system functionality and process received RF waveforms. System design supports TA2 applications, leveraging high-MRL, commercially available components that provide a pathway to BAA2 SWAP. In the same vein, the vapor cell design and fabrication techniques are readily scaled to batch fabrication.

At the culmination of Phase 2, a complete system comprising a 1 cm$^3$ vapor cell sensor head tethered by fibers and wires to a rack of control electronics and laser subsystems (FIG. 4) meet QA TA1 technical challenges 1, 2, and 4 listed in Table 2 of FIG. 7.

Measuring RF fields at the required intensities demands detection of Autler-Townes (AT) splitting at the few-Hz level. Two methods are combined to meet this demanding performance: a three-photon EIT process to reduce the residual Doppler shift and increases the number of participating atoms (see level diagram of FIG. 2) and a RF local oscillator (LO) to allow operation in the linear regime of AT splitting. Simultaneously, the sensor is tunable across the RF frequency range of interest. To achieve this, the Rydberg resonance is dynamically tuned by means of the DC Stark shift.

Broadband tunability is achieved through Rydberg state excitation to a frequency band of interest in conjunction with DC Stark shifts to fine tune the resonance within the band. Using three-photon excitation, resonances in the frequency band from 10 MHz-40 GHz are addressable in both $^{133}$Cs and $^{87}$Rb, while analysis of species dependent benefits finds $^{133}$Cs better suited to some goals. To fill gaps between discrete resonances, a DC electric field is applied to continuously tune selected resonances via the DC Stark shift.

Simulations of the available states reveal excitation schemes that can achieve reduced Doppler broadening energy mismatch in a collinear beam orientation. The energy mismatch (in frequency units) is given by $\Delta f = f_p - f_d + f_c$, where $f_i$ are the respective probe, dressing, and coupling laser frequencies. The table of FIG. 8 highlights available Cs transitions with the lowest energy mismatch. The magnitude of the mismatch reflects the degree to which beams must be angled away from collinear to achieve Doppler-free excitation. Despite a higher energy mismatch, the Cs 7D dressed state scheme benefits from the availability of suitable commercial off-the-shelf (COTS) lasers. However, a suitable 2.8 μm laser source can be used with the Cs 8D scheme, as it yields ~3× lower Doppler broadening in a collinear beam geometry, or, alternatively, allows less aggressive angular separation between beams.

Figure 9:
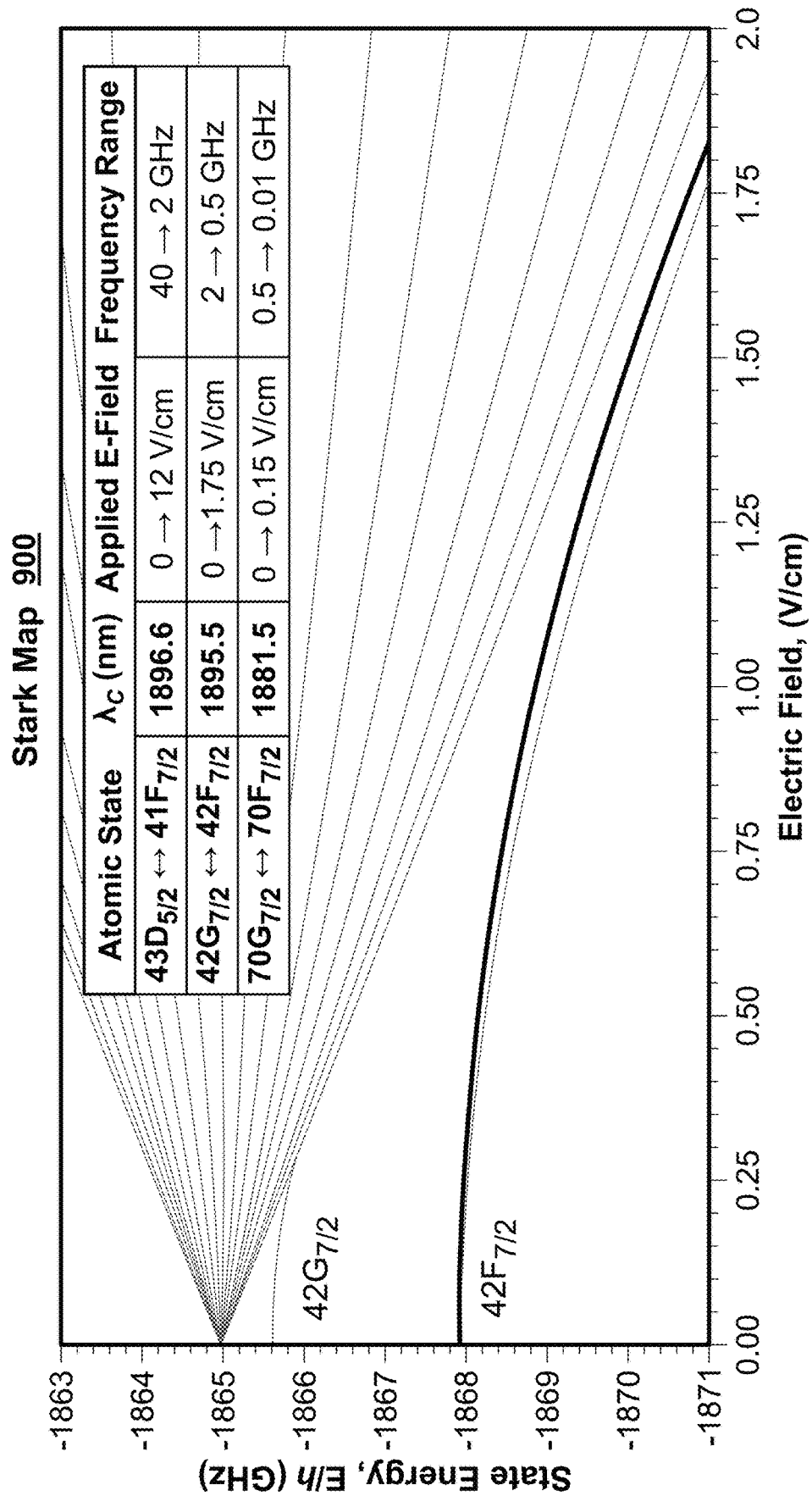
FIG. 9 (F4) is a Stark map of Rydberg levels of cesium 133 ($^{133}Cs$) in an applied DC Electric-field.

For the Cs 7D excitation scheme, the 10 MHz-40 GHz frequency range is addressable by three atomic states when combined with DC Stark shift tuning. FIG. 9 is a Stark map showing the shift in the energy gap between adjacent Rydberg states, and the inset lists the required coupling laser wavelengths and applied E-field magnitudes to provide the respective frequency band coverage. The maximum usable splitting of the Stark state is limited by the Inglis-Teller limit. To simplify laser system requirements, the minimum number of Rydberg states to cover the entire range of 10 MHz-40 GHz is met, but this requires DC fields up to 12 V/cm. To minimize exposure to the Inglis-Teller limit, the number of addressable Rydberg states can be increased to lower tuning voltages as implemented in an alternative embodiment.

The magnitude of the applied E-field drives the uniformity requirements of the field produced by the intra-cell field plates. For each frequency range, this correlates to a field uniformity across the excitation beams of <5%. While challenging, this level of uniformity can be achieved by selecting a favorable vapor cell geometry with respect to the optical beam path and patterning the field generating electrodes.

Although Stark maps, e.g., FIG. 9, and transition dipole matrix elements can be calculated with well-known methods, their precise experimental verification with optical excitation are only recently available and only in specific regimes. FIG. 9 is an example Stark map of $^{133}$Cs Rydberg levels in an applied DC electric-field. Increasing E-field strength reduces the RF resonance between $|42F_{7/2}\rangle$ and $|42G_{7/2}\rangle$ zero-field states from 0.5 to 2.2 GHZ. The inset of FIG. 9 is a table of Rydberg resonance tuning covering the TC2 frequency range. Furthermore, at large field strengths, significant level mixing tends to increase sensitivity to decoherence mechanisms. Hence, in the large field regime, experimental validation of specific Stark maps and oscillator strengths becomes critical for rigorously defining the optimal operation regime for our program and guiding design decisions.

This risk is addressed by performing benchmark experiments with Cs Rydberg spectroscopy apparatus. This experiment leverages laser-cooled atoms in optical tweezers to suppress Doppler-broadening, allow long interrogation times for enhanced resolution, enforce strict spatial control to ensure electric field and magnetic field homogeneity, and control atom-atom distances to minimize dipolar coupling. In this way, it serves as a pristine testbed to directly characterize sensitivity scaling under DC Stark shift tuning. Test results inform Rydberg state selection and enable maximum sensitivity across the QA frequency band of interest.

RF heterodyne detection boosts quantum aperture sensitivity and simultaneously enables reception of phase modulated signals of interest. By implementing a heterodyne scheme, phase-sensitive readout of the beat-note between the incident RF field and a ~mV/cm-scale LO field applied to the atoms uses the same electrodes in the vapor cell used for DC Stark tuning. Laboratory demonstrations of similar methods show orders-of-magnitude enhanced sensitivity by overcoming readout-limited signal-to-noise of purely optical transmission measurements. Thus, by applying a local oscillator with small detuning (<20 MHz) from the target field frequency, the atoms act as a RF filter picking up only a "slice" of frequencies close to the resonance between Rydberg states. Read-out of the target field intensity is achieved by observing the beat-note power level at frequency $\Delta_{RF}$ (see FIG. 2), between interfering RF and LO signals.

An alternative embodiment implements RF heterodyne by means of phase modulated coupling light as an alternative approach to applying the RF local oscillator using the intra-cell electrodes. The approach mitigates the RF emanations from the sensor and the crosstalk between adjacent arrayed sensor elements. Here, phase modulation is imprinted onto the coupling laser light by a high frequency electro-optical modulator (EOM), at the frequency of the received RF field of interest, resulting in a beating between the RF excitation and the RF-modulated optical coupling excitation. This technique is entirely novel to the field of Rydberg electrometry.

An alternative system has demonstrated 30 μV/cm/√Hz with AT-splitting detection using two-photon excitation, and 55 nV/cm/√Hz with an RF heterodyne—an impressive factor of >500× sensitivity improvement. In an optimized two-photon excitation schemes using AT-splitting detection achieved sensitivities of 3 μV/cm/√Hz. If optimized, the RF heterodyne technique in the alternative system could reach 5.5 nV/cm/√Hz. The three-photon excitation scheme provides >10× sensitivity enhancement over the standard two-photon scheme, indicating that sub-nV/cm/√Hz, or <−167 dBI, sensitivities can be achieved. The analysis below supports this inference.

Figure 10:
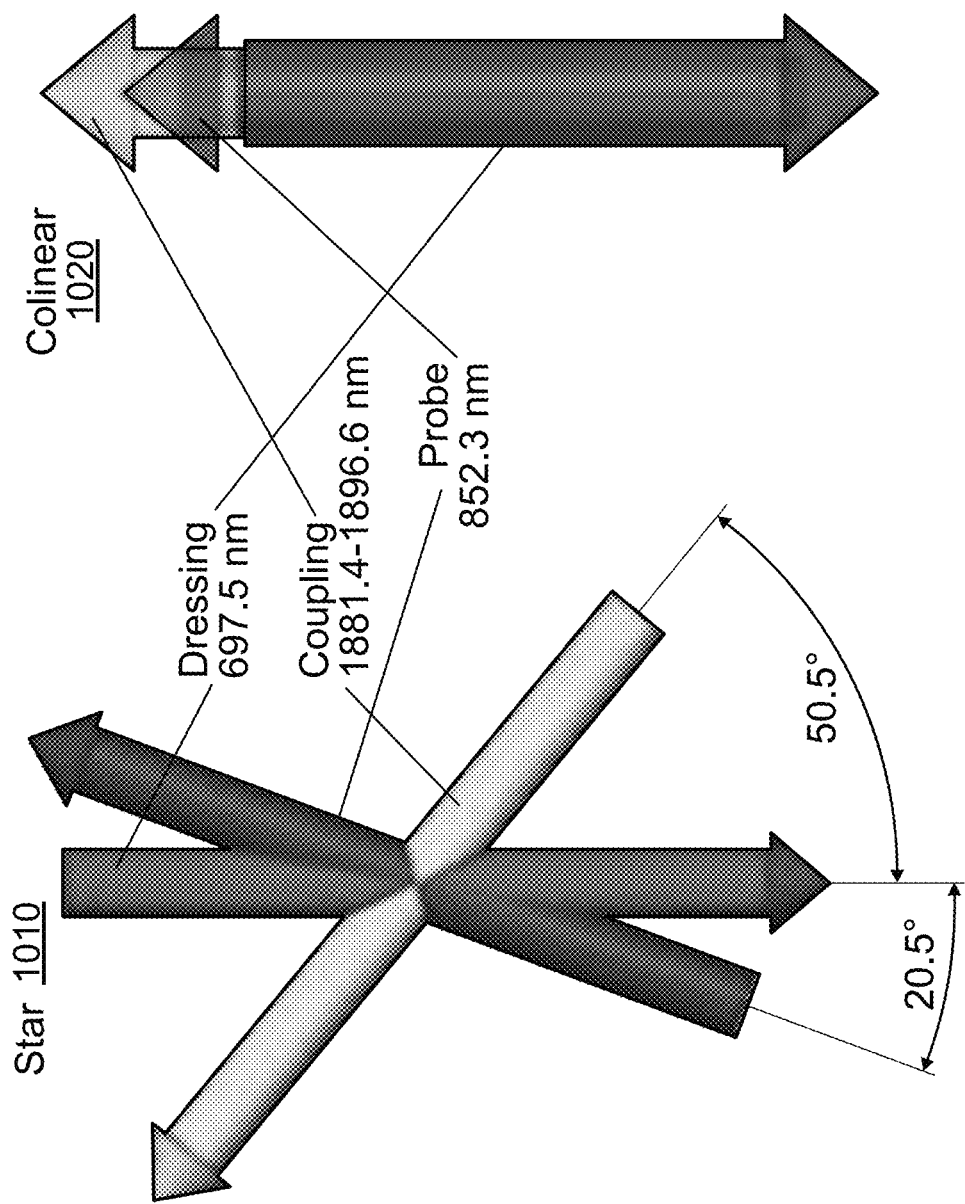
FIG. 10 (F5) is a diagram of star and collinear excitation beam schemes for Cs 7D dressed electromagnetically induced transparency (EIT).

Rydberg receiver sensitivity exceeding that of state-of-the-art classical antennas is made possible by mitigating dominant sources of EIT resonance broadening and maximizing the population of atoms interrogated in the compact vapor cell volume. Two viable optical configurations, 'star' 1010 and 'collinear' 1020, shown in FIG. 10, are available.

In an ideal EIT scheme, atoms of every velocity class would contribute to a narrow EIT feature. However, in traditional two-photon EIT in Cs, with 852 nm probe and 510 nm coupling light, the number of participating atoms is limited by Doppler broadening due to the thermal velocity distribution. Non-zero velocity atoms experience a detuning from the excitation state $|6P_{3/2}\rangle$, weakening the excitation. Further, the two-photon excitation is detuned from the target Rydberg state by 790 kHz per (m/s) of atom velocity. Increasing coupling intensity reduces the effect of this detuning but broadens the EIT feature. An optimal coupling intensity that balances atom participation and broadening has been implemented.

In the collinear three-photon excitation, the multi-photon detuning is reduced to 270 kHz per (m/s) of atom velocity. This results in a different balance between atom participation and linewidth, engaging a broader set of velocities. In the star configuration, the excitation is truly Doppler free, and atoms of all velocities are resonant with the multi-photon excitation. However, detuning from intermediate states still limits the velocity classes that participate. This is mitigated by the large dressing Rabi frequency that allows velocities with Doppler shifts $f_d \times v/c < \Omega_D$ to participate (roughly v<±20 m/s).

Figure 11:
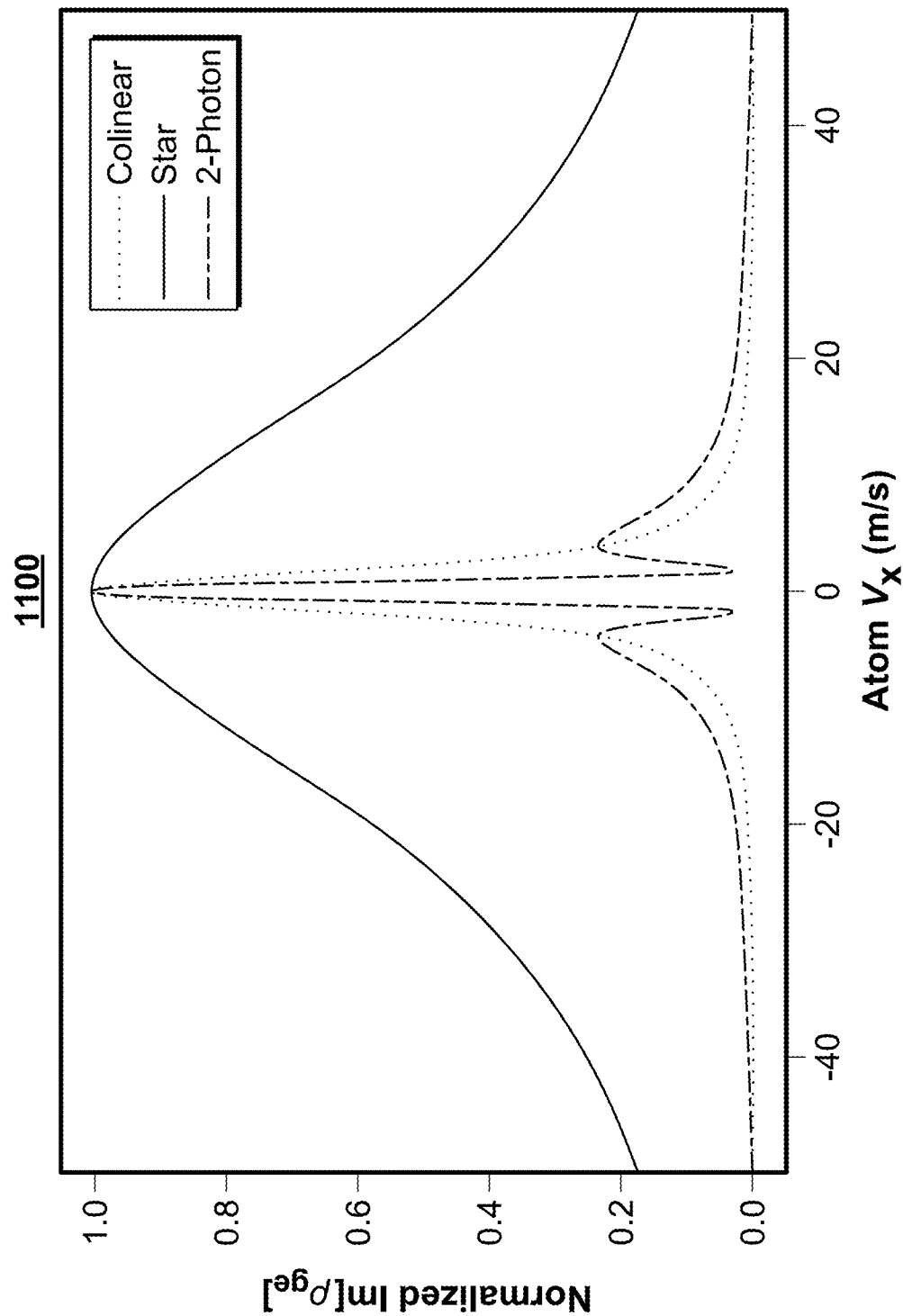
FIG. 11 (F6) is a graph comparing sensitivity vs. velocity across plural excitation schemes.

Because the coupling Rabi frequency is small, the EIT feature is still narrow. This is demonstrated in FIG. 11, where the normalized contribution of velocities to the EIT peak is plotted for two-photon, three-photon collinear, and three-photon star schemes. Contribution of atoms with different velocities, $v_x$, to $\text{Im}[\rho_{ge}]$ for sensitivity-optimized, three-photon collinear and star, and two-photon collinear systems. The three-photon collinear system samples a larger distribution of atoms than the two-photon system. The star geometry yields high sensitivity in a small interaction region by sampling a much broader set of atom velocities. The collinear scheme engages a broader range of velocities than the traditional two-photon scheme, while our star scheme engages a much broader range of velocities than either.

Figure 12:
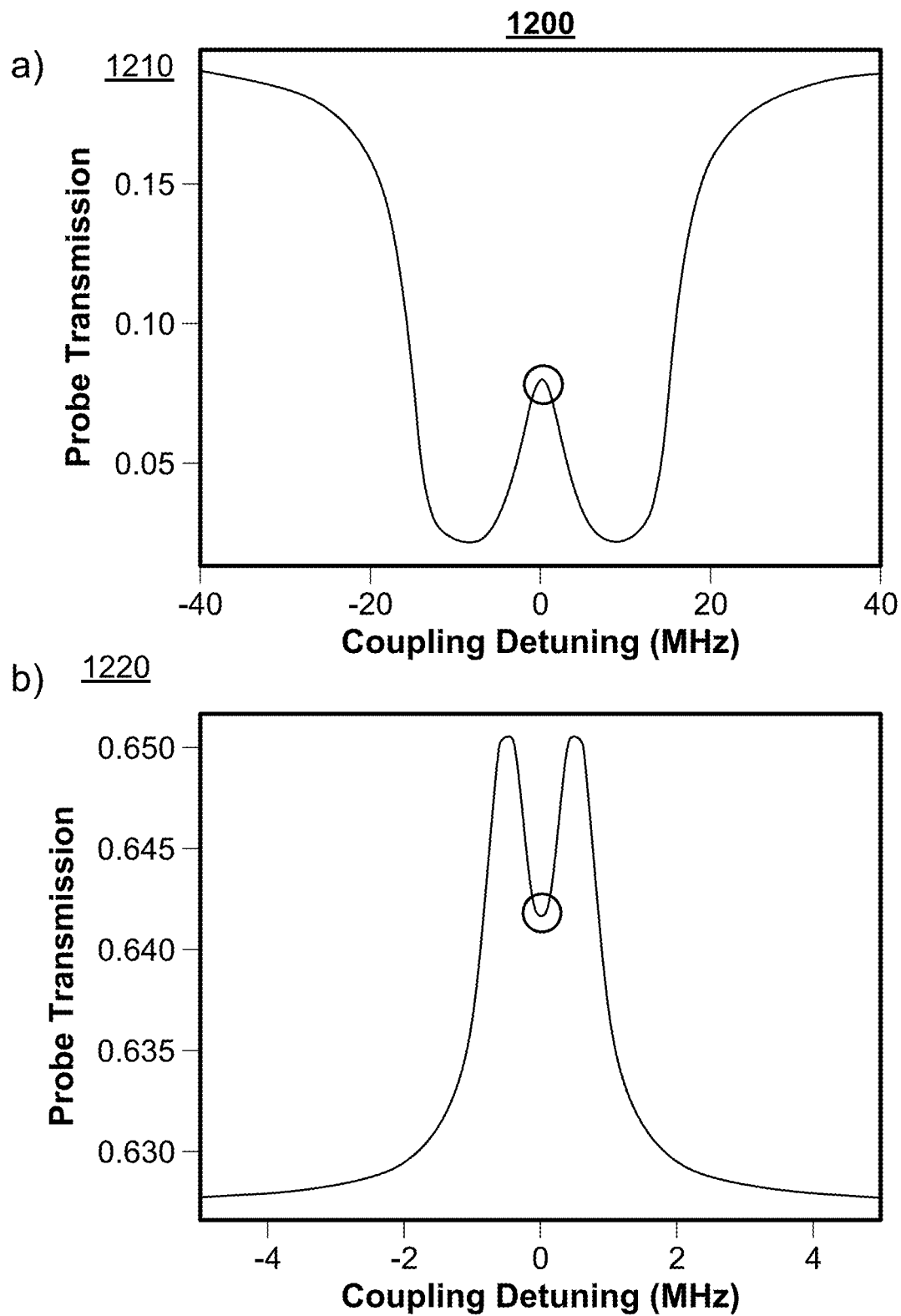
FIG. 12 (F7ab) is a pair of graphs of probe transmission vs coupling detuning for a collinear excitation beam scheme for a collinear excitation scheme (a) and a star geometry excitation scheme (b).

A five-state, four-field density matrix model of this system has been implemented to estimate photon-shot-noise limited sensitivity of both a star and collinear excitation laser orientations that accounts for known decoherence sources. The steady-state solution is found and translated to obtain the absorptive part, $\text{Im}[\rho_{ge}]$, into the probe transmission through a room temperature Cs vapor. The slope of probe transmission with small changes in RF Rabi frequency is compared to photon shot noise, accounting for beam intensity, transmission through the vapor, and detector quantum efficiency. Simulated spectra for the two geometries are shown in FIG. 12 in which the star scheme 1220 exhibits EIT, while the collinear scheme 1210 exhibits electromagnetically induced absorption (EIA), caused by coupling beam disruption of dressing-induced EIT.

A combination of high optical depth (>3 at room temperature) and strong EIA/EIT achieves higher sensitivity with lower path length than is required of other collinear two-/three-photon schemes. To achieve peak sensitivity, the coupling laser can be set to zero detuning, where the probe transmission is most dependent on changes in RF field (red circles in FIG. 12. FIG. 12 is a pair of graphs indicating probe transmission vs. coupling detuning for (a) collinear and (b) star geometries, simulated using the Rabi frequencies given in the text.

The transmission signal of the probe laser is modulated at the intermediate frequency and picked up by a photodetector. The local oscillator amplitude can be tracked and optimized to achieve optimal sensitivity. The expected performance limits are summarized in Table 4 of FIG. 13. The stated values account for expected coupling laser power, as well as a conservative estimate of the reduced dipole matrix elements under DC Stark tuning (⅕ that of the unshifted dipole moment).

To extract expected sensitivity performance of the two schemes, laser power and vapor cell geometry constraints are applied to the model. Collinear geometry is simulated with a 56 mm path length and 1 mm beams, finding shot-noise limited resolution of 0.5 Hz deviations in the RF Rabi frequency. Here, probe, dressing, coupling, and LO Rabi frequencies $[\Omega_P, \Omega_D, \Omega_C, \Omega_{LO}]=2\pi \times [3, 12, 10, 13]$ MHz, respectively. Sensitivity scales as the square-root of the coupling power, which is limited by commercial lasers, and exponentially with path length, set by cell geometry. Heating the vapor cell slightly above room temperature yields increased atom densities (×10 at 50° C.), allowing the same sensitivities in only 14 mm optical path length using the collinear scheme, despite higher collisional broadening.

For the star configuration, with 1 mm beams, findings include a RF Rabi frequency resolution of 0.5 Hz using $[\Omega_P, \Omega_D, \Omega_C, \Omega_{LO}]=2\pi \times [2.3, 28, 4, 1]$ MHz. Sensitivity again scales as the square-root of coupling power; however, the star configuration allows one to increase dressing power without loss of sensitivity. Herein lies the benefit of the star configuration, which achieves comparable sensitivity with much smaller interrogation volume; however, a significant challenge to overcome is the sensitivity to angular alignment. To reflect realistic micro-optic assembly tolerances, the model and stated sensitivities include angular beam tolerances of ~1 arcmin in alignment and collimation precision. In the lower part 1220 of FIG. 12, the base transmission of 0.63 is due to the probe path length outside of the 1 mm³ volume where probe, dressing, and coupling beams overlap. The observed EIT effect is entirely due to the strong interaction induced by combining Doppler-free dressing and coupling beams.

The coherence time T2 has contributions from transit time broadening $\Gamma_t$, collisional broadening $\Gamma_c$, blackbody-broadened Rydberg lifetimes $\Gamma_{lt}$, and laser linewidths $\Gamma_l$. Thermal motion of room temperature Cs atoms in a 1 mm beam corresponds to transit-time broadening of $\Gamma_t=2\pi \times 50$ kHz. Rydberg-ground state atom collisions are the primary source of collisional broadening, $\Gamma_c=2\pi \times 10$ kHz. The blackbody broadened lifetimes of our target states are calculated using the ARC python package to be $\Gamma_{lt}<2\pi \times 6$ kHz. Finally, the combined laser decoherence from our locked system will be $\Gamma_l<2\pi \times 40$ kHz. Considering these contributions, we expect a coherence time T2=10 μs, much longer than the program goal of 100 ns. For the star geometry, sensitivity optimized EIT lines are on the order of 1 MHz, while the collinear geometry achieves an effective linewidth of 1.5 MHz. Laser power requirements for this performance is provided in Table 5 of FIG. 14.

At the high-intensity limit of +50 dBI, AT-splitting is >100 GHz, much larger than state separation. Further, strong fields greater than the level crossing field drives multi-photon transitions and ionization. At intensities in the region of −10 to 10 dBI, it will be advantageous to switch to detection methods demonstrated for large static fields. One possibility is resonant two-photon RF transitions, which have been demonstrated from <−25 to 20 dBI. Multi-RF-photon AT splitting is applicable for higher RF intensity, allowing +50 dBI RF fields to be detected. Another embodiment employs Floquet sideband detection using a P state. This has the advantage of continuous tunability with minimal laser detuning and has been demonstrated at intensities from −10 to 45 dBI, though only up to 500 MHz. These techniques do not require additional hardware system complexity and can be extended to frequencies of interest.

Figure 15:
FIG. 15 (F8) is a screen shot of a CAD model (and a US quarter for scale) of a vapor cell with collinear multi-pass beams.

Vapor cell geometry is optimized to accommodate STEARS operational requirements including, the 1 cm³ sensor head volume limitation, incident RF field uniformity within the vapor cell, DC and RF LO applied field uniformity, as well as overall sensitivity requirements. FIG. 15 shows a CAD model of the vapor cell, with multi-pass, three-photon excitation beam path. The CAD model shows a vapor cell, with collinear multi-pass beams. Four beams are shown; optics are readily scaled to achieve eight passes yielding 56 mm optical pathlength. Cell windows normal to excitation beams are coated with transparent, conductive electrodes. Teledyne micro-optic systems mount to the vapor cell, injecting probe, dressing, and coupling light. US quarter is shown for scale.

Along the propagation direction of the incident field, the inside dimension of the vapor cell, D, is made small compared to $\lambda_{RF}$, to avoid standing wave patterns within the vapor cell due to the Fabry-Perot effect. This effect can cause up to 100% modulation of the RF field intensity within the cell, but tests have shown that for $D<\lambda_{RF}/4$, intensity modulation of the detected field is nearly eliminated. This effect primarily impacts accuracy of the measured field strength (but not frequency), and by reducing intra-cell field modulation well behaved sensor response is assured across the broad QA frequency range. Vapor cell size scaling is most severe at higher frequencies, with 40 GHz corresponding to $\Delta_{RF}=7.5$ mm, so to completely mitigate the FP effect, cell dimension D<2 mm along the received field propagation. However, reducing the vapor cell size complicates realization of uniform applied fields within the vapor cell and avoiding unwanted overlap between excitation beams of opposite propagation direction, which spoils sensitivity. Table 6 of FIG. 16 provides dimensions for our baseline vapor cell.

Figure 17:
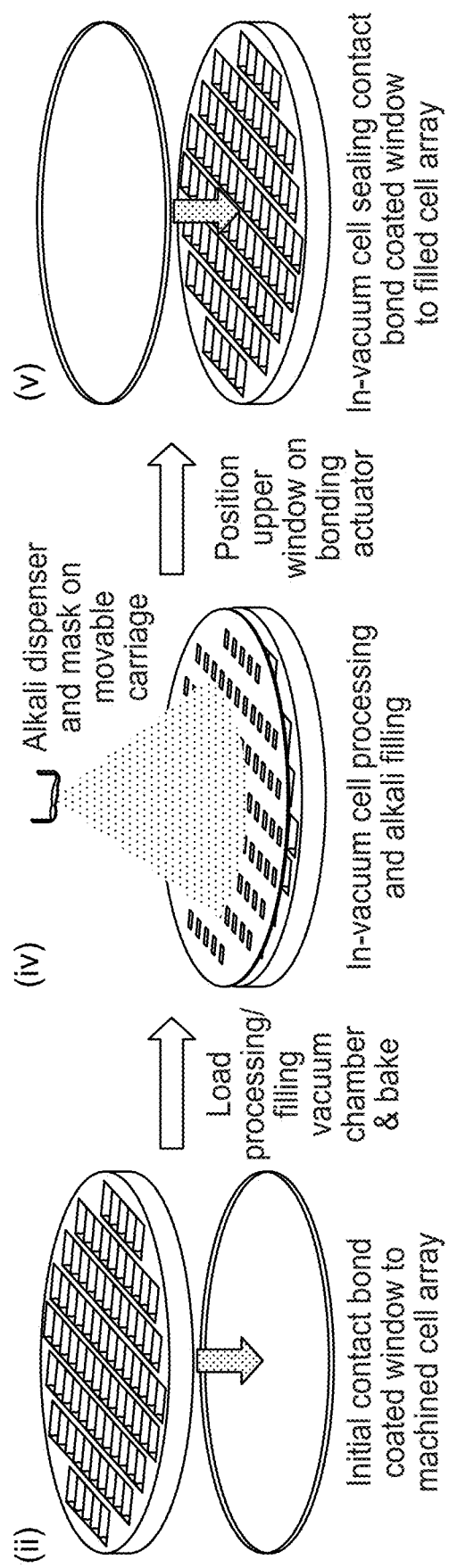
FIG. 17 (F9) is a flow diagram of a vapor cell batch fabrication process.

Vapor cell construction utilizes contact bonding techniques to hermetically seal Pyrex windows with patterned electrodes to a rectangular cross-section Pyrex cell body. Small, monolithic arrays of vapor cells are constructed to increase cell yield and facilitate robust contact bonds. The fabrication process flow is shown in FIG. 17. As shown in FIG. 17, vapor cell batch fabrication process flow: (i) voids machined from Pyrex wafer of correct thickness (H, internal) form an array of vapor cell void; (ii) first window contact bonded to machined wafer; (iii) Bonded wafer inserted into UHV bonding chamber and baked. (iv) Masked cell voids filled by alkali dispenser. (v) In-vacuum bond seals cell array; (vi) Cells singulated. Once the cell array is complete it is singulated, yielding multiple vapor cells with >99% RF transparency in all directions, with one axis of high-quality optical access. This technique enables straightforward scaling to arrayed quantum apertures (N=100).

RF transparency of the vapor cell is maximized through material selection and internal electrode design. First, consider the complex permittivity, $\epsilon^* = \epsilon' - i\epsilon''$, of candidate vapor cell materials: Fused silica (quartz), borosilicate (Pyrex), and aluminosilicate glass. Here, $\epsilon'$ is the real portion of the permittivity, which is responsible for refraction of the incident RF field within the vapor cell material, while $\epsilon''$ is the imaginary part and leads to attenuation of the RF field. The loss tangent, $\tan \delta = \epsilon''/\epsilon'$, quantifies the inherent field dissipation within the material, factoring in both "lossy" and "lossless" reactions to the field. The magnitude of the electric field as a function of the propagation distance within a material is given by, $E(z)=E_o e^{-\alpha z}$, where $\alpha$ is the decay constant due to dissipation within the medium, $$\alpha = (2\pi/\lambda)\left[\frac{\epsilon'\left(\sqrt{(1+(\tan\delta)^2)}\right)}{2}\right]^{1/2} = (2\pi/\lambda)\left[\frac{\epsilon'\left(\sqrt{(1+(\tan\delta)^2)}\right)}{2}\right]^{1/2}.$$

Both $\epsilon'$ and $\epsilon''$ are frequency dependent. Values in the frequency range are given in Table 7 of FIG. 18, along with the loss tangent and the resulting RF transmission at 40 GHz. Thus, vapor cell glass selection is not a dominant factor in achieving the >99% transmission metric, and other vapor cell elements (e.g., internal electrodes) can dominate.

RF field attenuation due to internal electrodes depends on orientation of the polarization with respect to the plane of the electrodes and can be thoroughly modeled using FEA software during the program. The electric field decays exponentially according to $E(z)=E_o e^{-z/\delta}$ where $\delta=\sqrt{\rho/\pi f\mu_0}$ is the frequency dependent skin depth for a RF field of frequency f and film resistivity, ρ. Attenuation of the incident field is most severe at high frequency, so we consider attenuation at 40 GHz, the maximum frequency of interest to the QA program.

Figure 19:
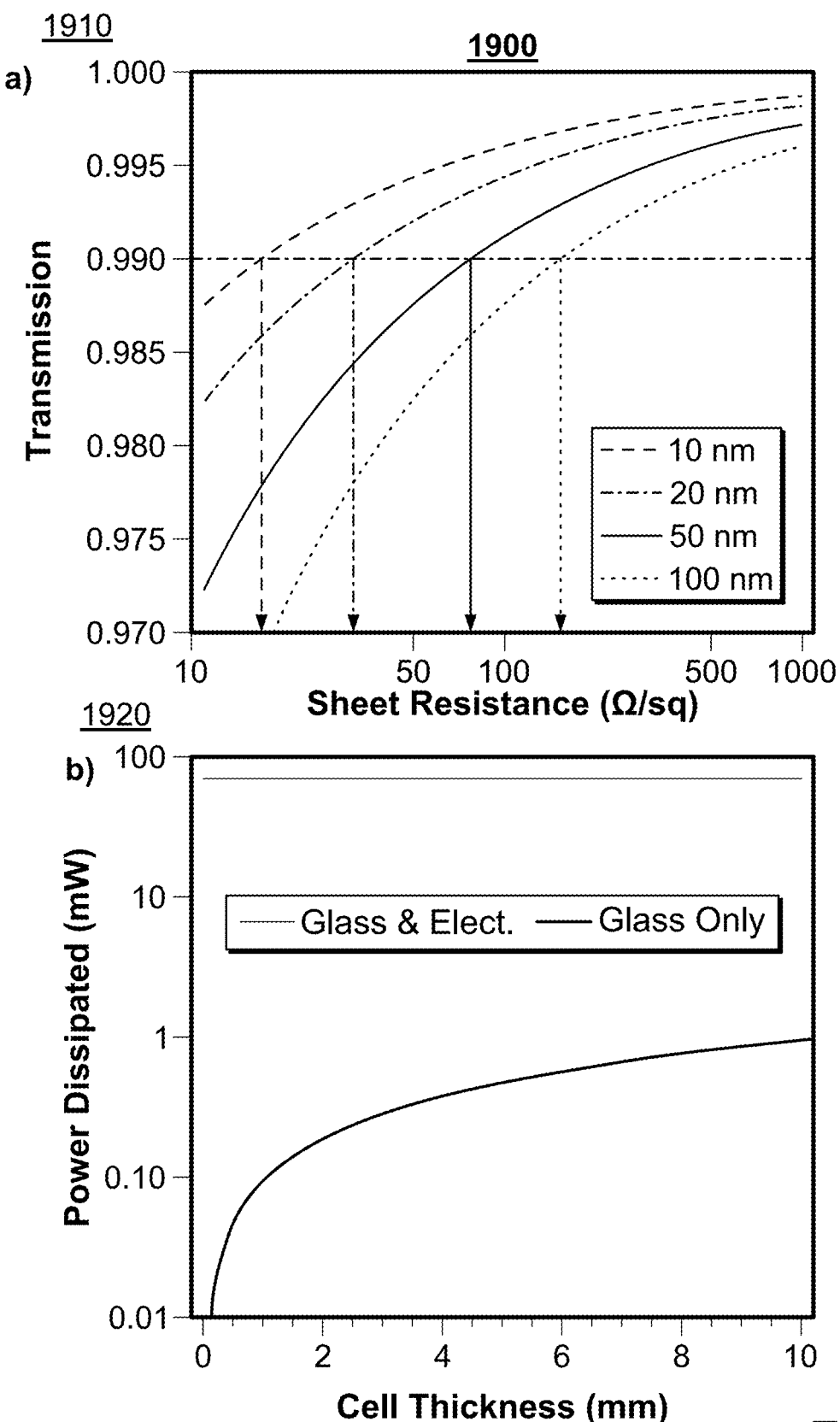
FIG. 19 (F10) is a pair of graphs indicating RF field transmission and RF power dissipation through transparent electrodes used on the vapor cell walls.

The upper graph of FIG. 19 plots RF transmission through low-conductivity, optically transparent films of various thicknesses, e.g., Indium-Tin Oxide (ITO). In FIG. 19, a) 40 GHz RF field transmission through thin-film electrodes of varied thickness. Vertical dashed lines indicate minimum sheet resistance for >99% transmission. Target film thickness, 20 nm, and sheet resistance, 400 SI/sq, yield 99.7% transmission. b) RF power dissipation in a 50 dBI field.

With the RF transmission in hand, the power dissipated as heat within the glass vapor cell walls is estimated from $P=E^2/Z_0$, where $Z_0=377$ is the impedance of free space. Not all attenuation translates to heat, some is re-radiated as a scattered/reflected field. To be conservative, one can consider the full attenuation as heat. Even at the high end of received field strength, 50 dBI, the power dissipated is <100 mW, as illustrated by the lower graph of FIG. 19, indicating that the vapor cell can readily survive exposure to such high intensity fields.

Figure 21:
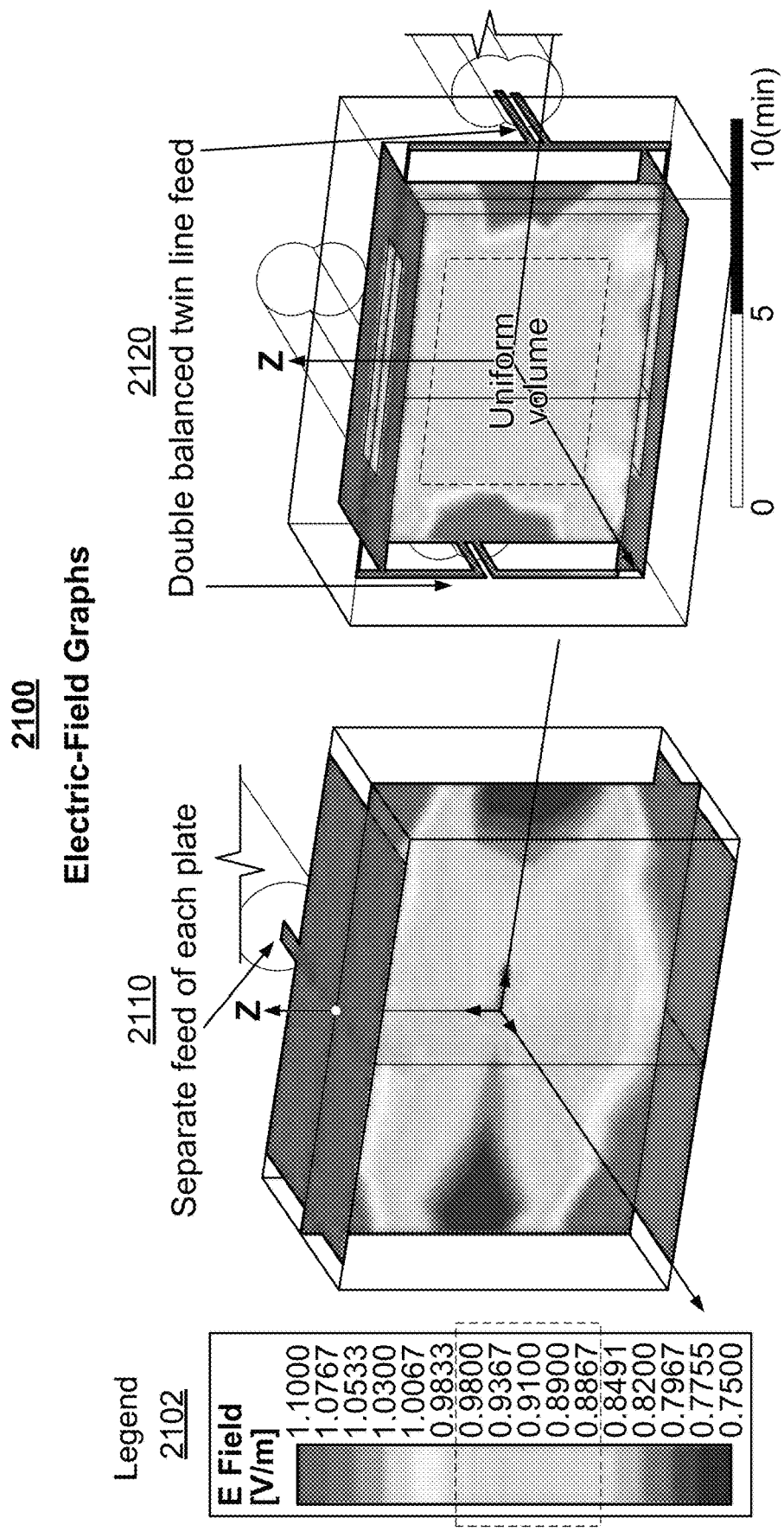
FIG. 21 (F10) is a pair of graphs indicating field uniformity for a couple of electric feed designs for the transparent electrodes of FIG. 19.

RF LO/DC field electrode design objectives and baseline design approach are summarized in Table 8 of FIG. 20. To avoid possible screening effects due to alkali on the cell walls, these electrodes are internal to the vapor cell. Vapor cell electrode design can support sensitivity requirements and minimize unintended emissions in support of applications developed in TA2. The vapor cell design achieves sufficiently uniform RF LO and DC fields within the cell, while providing optical access to the excitation light. FIG. 21 shows simulation results of DC field for simple rectangular electrodes and cell dimensions in Table 6 of FIG. 16. In FIG. 21, electrodes with separate feed for square plates (left) show non-uniform fields. Double balance twin line feed (right) provides more uniform fields within beam volume. The field has ~10% variation across the interrogation volume. Exercising design objectives (Table 8 of FIG. 20), drives up uniformity to the required levels and, in the process, detector sensitivity.

Vapor cells with electrodes in various configurations (see Table 8 of FIG. 20) can be used, ensuring the core technology supports standard platform applications. During device characterization and eventual installation, introduction of lossy foam between the vapor cell and the ground plane can mitigate standing wave effects that reduce the detectable incident field.

Both ITO and TSI's TransCon are candidate transparent, conductive thin films. These films simultaneously provide adequate electrode conductivity for LO RF and DC e-field generation, as well as broadband high optical transparency (>99% in the case of TransCon), allowing simplified injection of laser beams into the interrogation volume. ITO is known to interact poorly with high density alkali at elevated temperatures, so some embodiments use conductive passivating films (e.g., Indium doped $Al_2O_3$).

Micro-optics assemblies can be attached to opposing ends of the vapor cell to provide compact, fiber-coupled light delivery and collection. The micro-optics system can launch three beams at distinct wavelengths into well-defined angular and polarization relationships into the cell and collect beams from the cell for detection or appropriate termination. Launched beams target a uniform intensity profile over a diameter of ~ 1 mm, while the emerging detection beam can be collected with high efficiency. Performance can be achieved in an assembly occupying minimal size, to maximize the vapor-cell interaction volume and sensitivity within the 1 $cm^3$ sensor head volume constraint. Table 9 of FIG. 22 lists micro-optic system innovations.

Figure 23:
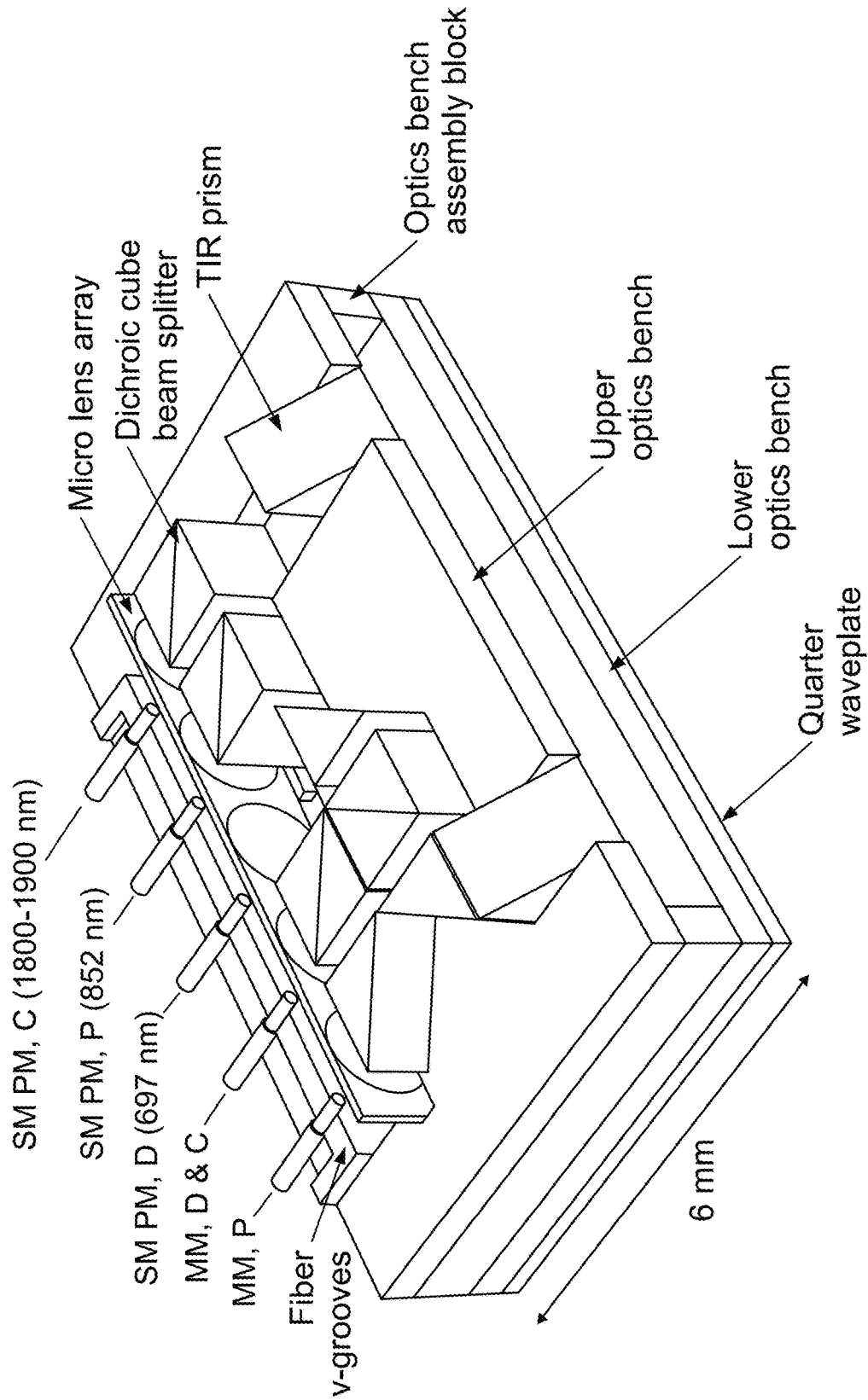
FIG. 23 (F11a) is a perspective view of an upper end assembly 2300 for a vapor cell used in the receiver of FIG. 1.
Figure 24:
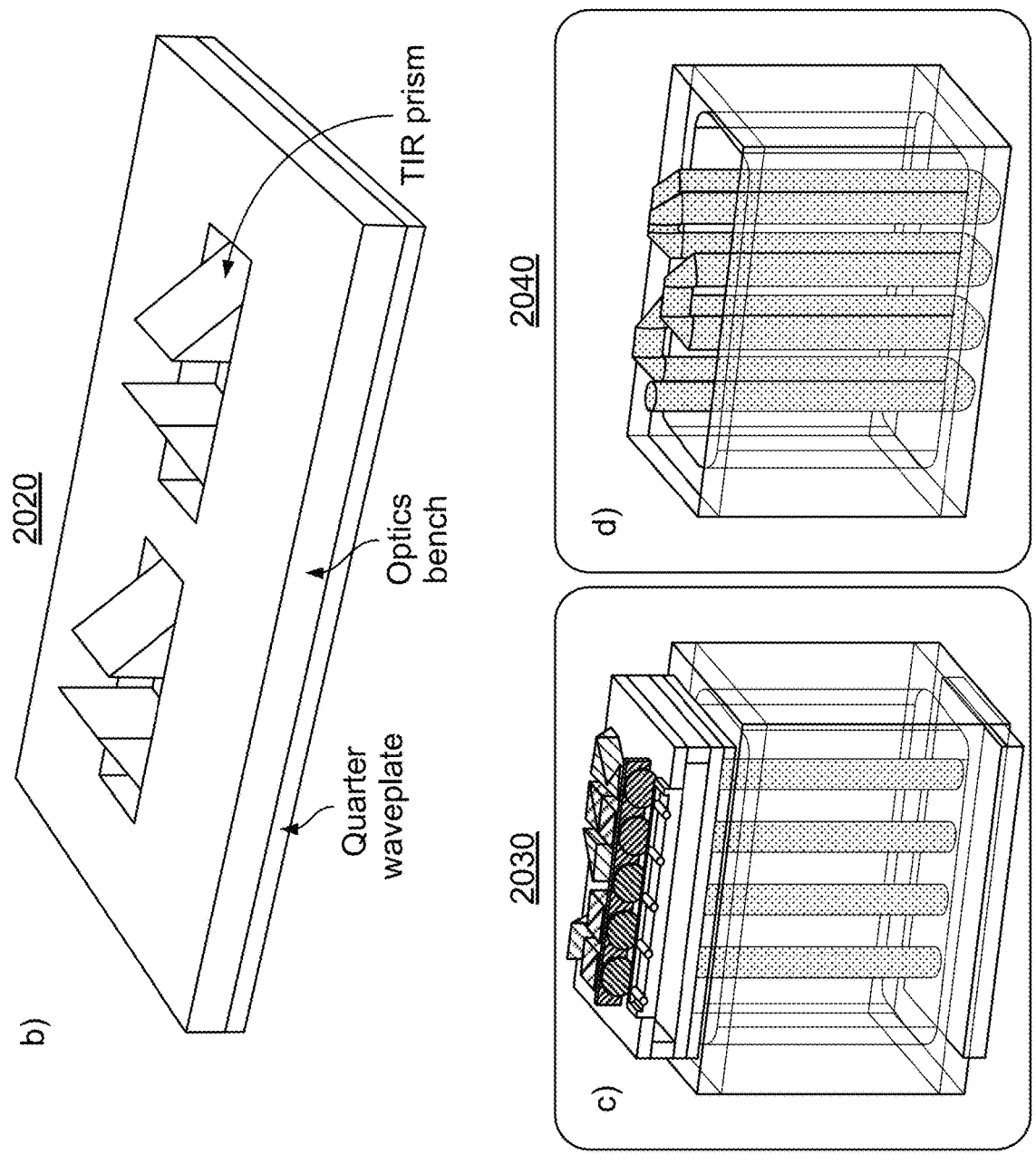
FIG. 24 (F11b, c, d) includes a perspective view (b) of a bottom end assembly for a vapor cell used in the receiver of FIG. 1, a view (c) of an entire vapor cell assembly, and a representation (d) of an eight-pass folded excitation path used to excite cesium atoms in the vapor cell.

The micro-optics architecture, shown in FIGS. 23 and 24, includes two optical assemblies, one above and one under the vapor cell. Micro-optic light delivery and collection system model: a) upper assembly with fiber input/outputs, compact collimation optics, dichroic beam splitters, and total internal reflection (TIR) steering optics and multi-wavelength quarter waveplate; b) lower fold mirror assembly with quarter waveplate and TIR mirrors. c) complete 4-pass system. d) 8-pass system, optical system omitted to show folded beam path. The top optical assembly is a two-layer stack. The upper layer has features/components for coupling light from/to fibers, shaping and combining beams, and directing beams into the lower layer. The lower layer redirects the beam into the cell, where it undergoes multiple passes through the cell volume, with the bottom optical assembly folding the beam path. All beam manipulations (expansion/convergence, combination, redirection) are performed upon linearly polarized light, which facilitates polarization control. Light is converted to circular polarization upon entry(exit) to(from) the vapor cell, using a chromic waveplates at each optical assembly/cell interface.

Figure 25:
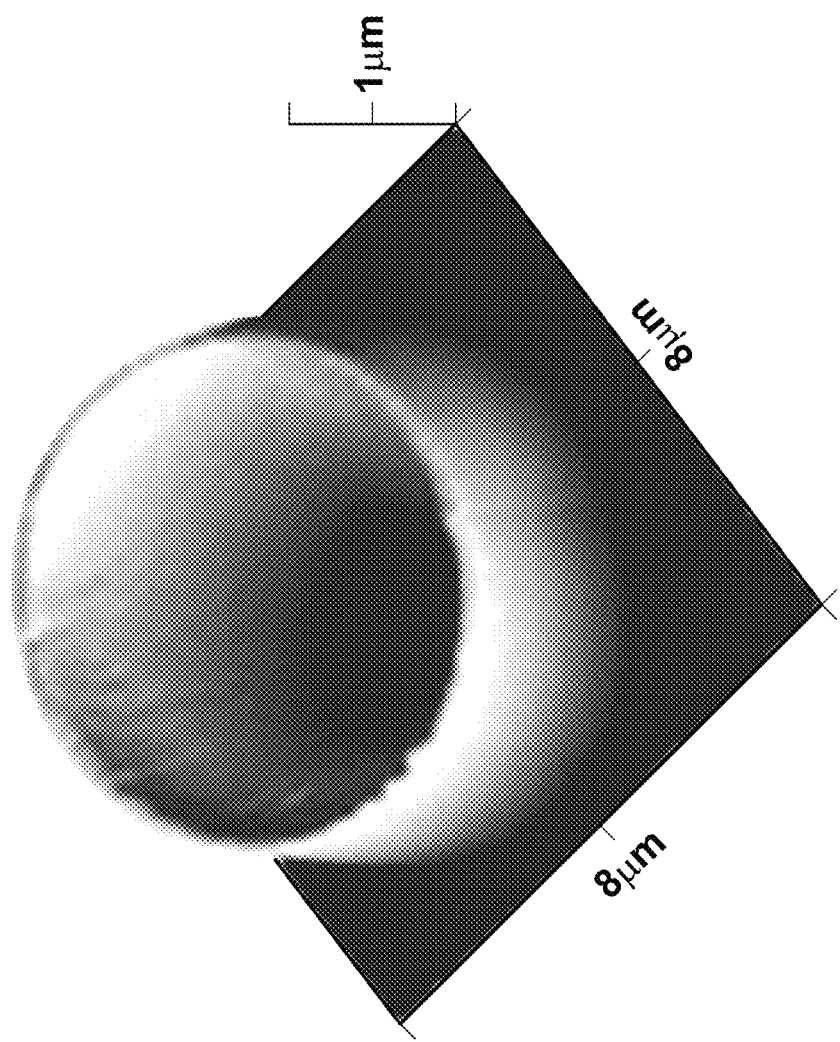
FIG. 25 (F12) is a representation of a topology of a beam-shaping structure at a tip of an optical fiber used to launch probe, dressing, and coupling laser beams into the vapor cell.

The top optical assembly can provide beam manipulations for either star or collinear beam paths in the vapor cell. The collinear scheme is shown in the bottom left of FIG. 24. Three separate launch fibers and two collection fibers are used, one for the probe beam (P) and the other for the dressing beam (D) and the coupling (C) beam. Launch fibers can be polarization-maintaining single-mode fibers, while collection fibers can be large-core multimode fibers. Compact beam expansion and shaping for launch fibers can be provided by fine structures patterned at the fiber tip 2500 (FIG. 25), a recent advancement in fiber technology. These structures increase the fiber numerical aperture and create the desired top-hat intensity profile, which improves measurement sensitivity by providing uniform Rabi frequencies across the overlapping interrogation volume.

A five element micro-lens array can collimate the three transmit beams and focus the two receive beams for coupling into multi-mode receive fibers. The micro-lens array can be machined utilizing two-sided processing of a UV-fused silica wafer, compatible with all wavelengths. Miniature dichroic beam splitters and folding mirrors, also fused-silica, can provide appropriate routing. Keeping light linearly polarized significantly simplifies demand on dichroic coatings. It also enables use of extremely efficient total internal reflection (TIR) for beam folding. Where possible, transmissive air glass interfaces can be eliminated by incorporating additional glass and index matching (not shown in current sketches) to minimize reflection losses and need for anti-reflection (AR) coating. The remaining glass-air interfaces are coated with broadband AR coatings. Baffling (not shown) is used to block stray reflections.

Figure 26:
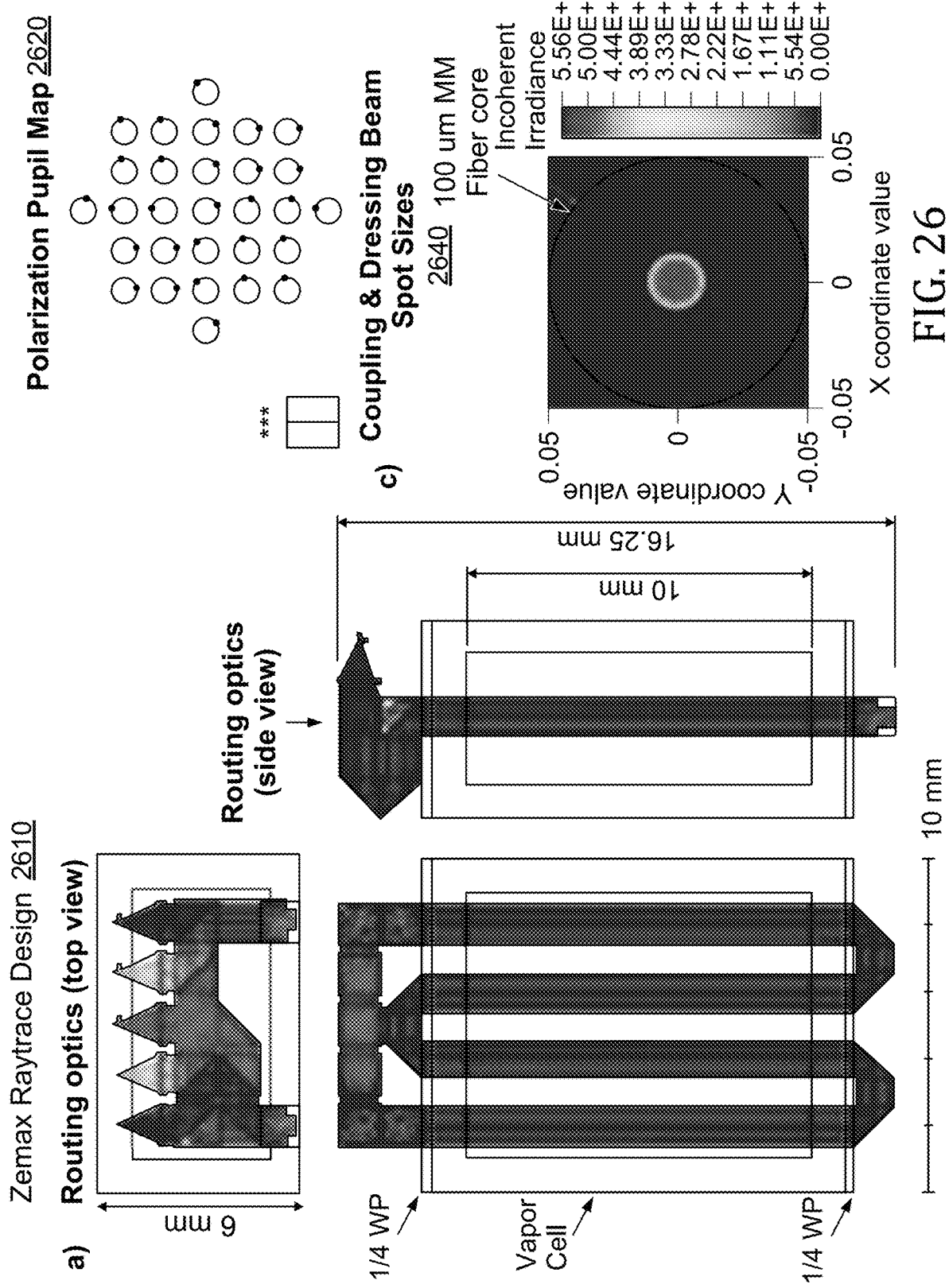
FIG. 26 (F13) includes a Zemax raytrace design (a), a polarization map (b) of the vapor cell interior, and a combined spot size (c) of the coupling and dressing beams.

FIG. 26 shows a preliminary Zemax raytrace layout of the baseline collinear beam routing configuration. The two optical assemblies at opposite ends of the vapor cell provide a long path-length, which can be further extended by folding the path in the orthogonal direction if necessary. Optical models for polarization are used for analysis to ensure a compliant circular polarization is maintained inside the cell.

Compact, high-performance micro-optic assemblies can be assembled using miniature custom optics, manufactured by TSI and commercially, held and aligned by low-profile optical benches micromachined from high resistivity silicon. These structural components, with layers having thicknesses of a few tenths of a millimeter, are made small and resistive enough to minimally perturb the target and LO RF fields and have negligible impact on cell transmission. Micro-lens arrays will consist of ~0.25-0.5 mm thick substrates with etched convex surfaces. Coated TIR prisms and dichroic cube beam splitters are available in nominal side lengths of ~1.25 mm. Waveplates consist of ~0.25 mm thick slabs with suitable coatings. Micromachined optical benches can be formed by two-sided etching and wafer precision bonding. The assembly has a top optical assembly height of 2.75 mm and bottom assembly height of 1.5 mm, with both having a 6 mm×10 mm footprint, allowing for vapor cell dimensions provided in Table 6 of FIG. 16.

Lithographic tolerance on the micro-optical benches and high-precision angles on the micro-optic components allow passive pick-and-place assembly with good alignment. Only the receive fiber focus is actively adjusted prior to gluing. Angular tolerances of 5 arcsec, and lithographic optical bench dimensional tolerance of 2 μm indicates that predominantly passive alignment approaches (except transmit PM fiber alignment and fiber focus) can be used to achieve high optical coupling efficiency (>95%) in a 100 μm core fiber. Table 10 of FIG. 27 shows current estimates for end-to-end transmission of each wavelength.

The Software-Defined Rydberg Radio ($SDR^2$) serves as the brains of the STEARS hardware system, enabling full receiver functionality and addressing technical challenges on sensitivity, rapid tuning, arbitrary waveform processing, and array scalability.

Figure 28:
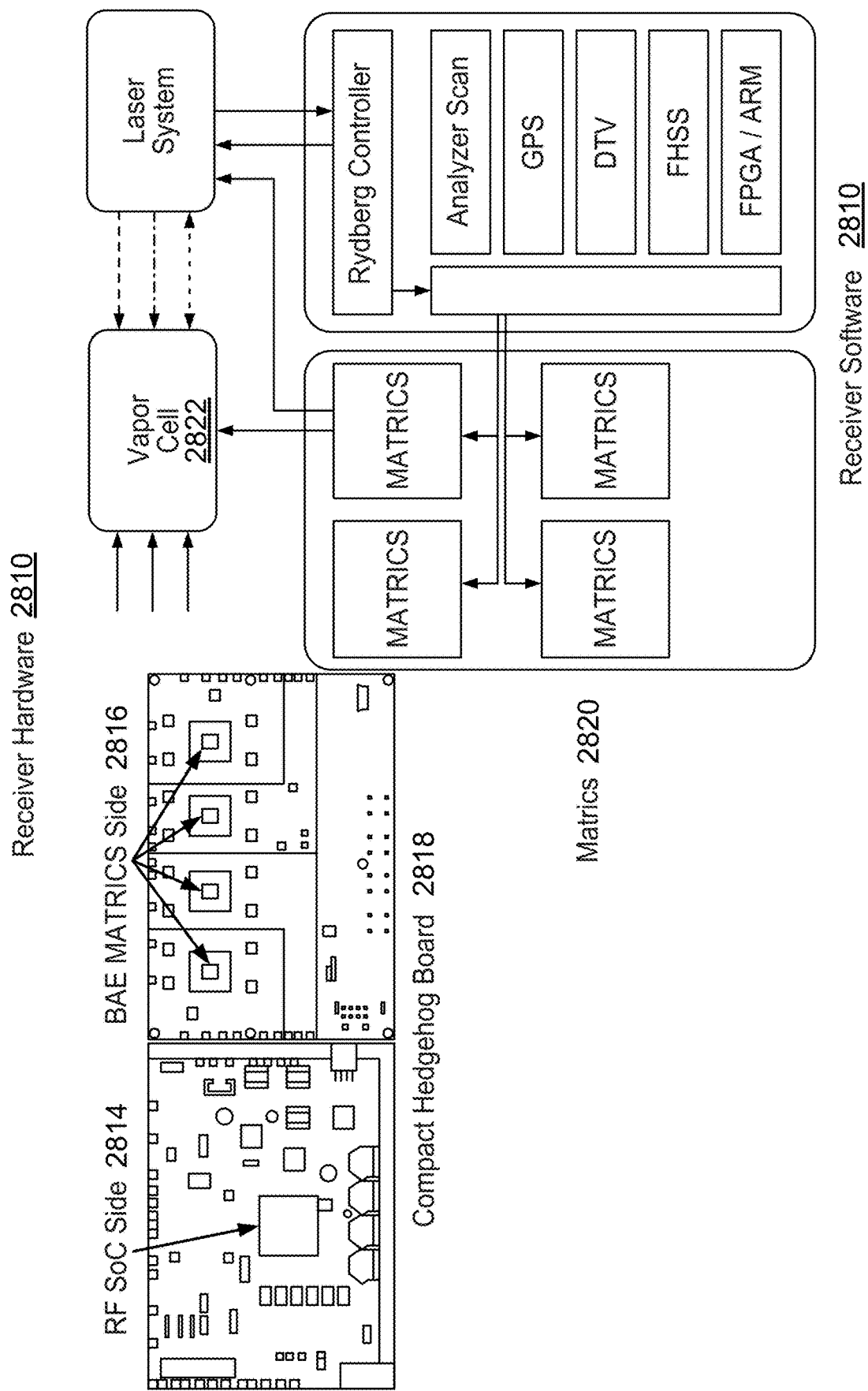
FIG. 28 (F14) is a mixed media representation of the hardware and software of the receiver of FIG. 1, which follows a software-defined receiver (SDR) design.

FIG. 28 summarizes the approach to the $SDR^2$ hardware 2810 and architecture. SDR2 hardware and architecture supports an extensible, compact package for demonstration of a single element Rydberg controller 2812, orchestrates laser, RF, and detection signals during tuning and detection. The multi-function, converged RF design supports 4 elements and lowers risk towards incorporating novel waveforms and existing mission-relevant modes in BAA2 and beyond. Hardware blocks shown in white, while modes shown in light peach color. Xilinx RF-SoC 2814 and BAE MATRICs ultra-wideband transceivers 2816 combine for low SWAP, scalability, and extensibility towards a future 100-element quantum aperture.

The hardware consists of a BAE Systems Hedgehog board 2818 combining two key pieces: 1) a Xilinx Zynq Ul-trascale+ Radio Frequency System-On-a-Chip (RFSoC)

ZU27DR FPGA 2814 with embedded analog-digital converters, and 2) four Microwave Array Technology for Reconfigurable Integrated Circuits (MATRICs™) ultra-wideband transceivers 2816. The MATRICs 2820 is a field-reprogrammable array of RF subsystems covering a broad band on a single 8×10 mm chip. Each chip provides 2 TX and 2 RX independently controllable channels, for a total of 8 TX and 8 RX on one Hedgehog. The on-chip switchable interconnects allow blocks in each channel to be cascaded to form various transceiver circuits with programmable gain, bandwidth, and dynamic range. This flexibility allows the chip to be adapted on-the-fly to meet widely disparate requirements of a range of applications.

For quantum apertures, Hedgehog 2818 is applied as a converged RF and Laser Rydberg Controller, collapsing what would be multiple, narrowband, special purpose rack units into a compact, reconfigurable package. Table 11 of FIG. 29A summarizes estimated requirements. Preliminary allocation of Hedgehog resources (ECDL config) to support a single sensor element. Scaling to an array, probe and dressing resources remain fixed. In this configuration, one Hedgehog (16 ADCs, 16 DACs, 8 MATRICs ins/outs) supports the Phase 3, 4-element array.

The Hedgehog 2818 (FIG. 28) is used to drive broadband, fine-tuned heterodyne RF into each vapor cell 2822 and leverage the rapidly programmable nature of the board to orchestrate the rapid, simultaneous switching of the lasers 2824, heterodyne RF, and DC-field to achieve rapid tuning across the required range of frequencies. Receipt of arbitrary waveforms will be demonstrated by reusing the lab demonstration setup developed under DARPA RFMLS. The setup includes analyzer scan capability, MATLAB interfaces for rapid experimentation, and arbitrary waveform transmit/receive to drive lab testing. Table 12 in FIG. 29B shows the progression of capability for Phases 1 and 2. In a phase 1 embodiment, a Hedgehog is built using MATRICs V3. It is a narrower microwave bandwidth that still exceeds Phase 1 requirements and is available on program start. In a phase 2 embodiment, MATRICs V4 featuring full quantum aperture bandwidth are used.

Figure 30:
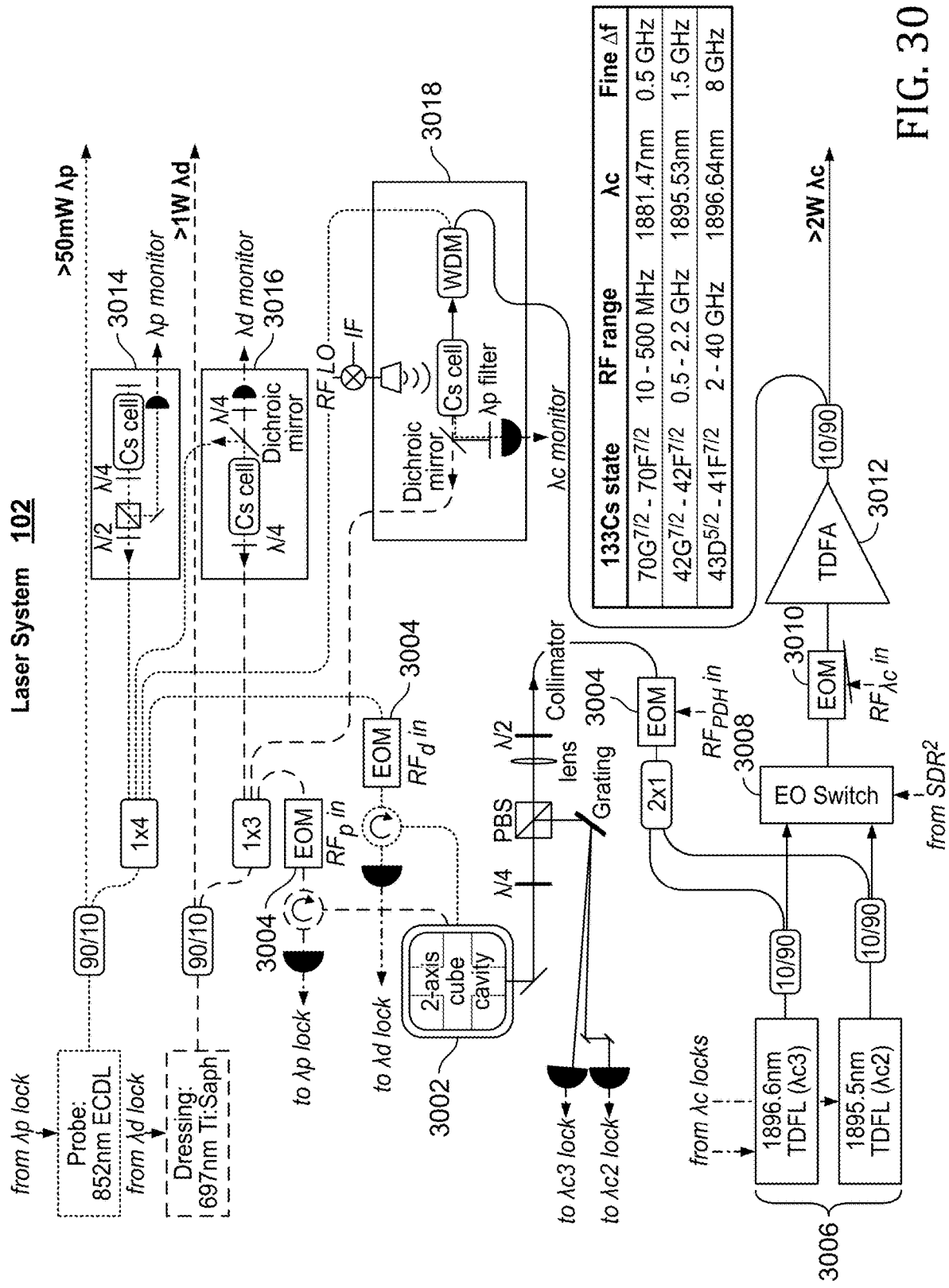
FIG. 30 (F15) is a diagram of a laser architecture for the receiver of FIG. 1.

Laser system 102 for three-photon excitation light with the required linewidth and power for the Cs 7D dressed state is shown in FIG. 30. All three wavelengths are stabilized to the same two-axis, high-finesse optical cavity 3002 for linewidth narrowing via PHD locking using in-line EOMs 3004. Phase 1 RF channel switching is accomplished using two thulium-doped fiber lasers (TDFL) 3006 toggled by an EO switch 3008. Coupling light fine tuning is performed by EOM 3010 prior to amplification by a thulium-doped fiber amplifier (TDFA) 3012. Reference cell sub-systems provide monitors 3014, 3016, and 3018 of absolute probe wavelength (green) 3014, EIT signal (blue) 3016, and RF detection in a standard vapor cell (red) 3018. Addressable RF range given coarse and fine coupling laser tuning are shown in the table inset for FIG. 30.

The constituent lasers and amplifiers in the baseline architecture are all COTS; other embodiments use alternatives listed in the right-most column of Table 13 of FIG. 31. All lasers are offset-locked to a 50 mm, 2-axis cube cavity via Pound-Drever-Hall (PDH) locking. One axis of the cube cavity 3002 is coated for finesse >$10^4$ at the probe and dressing wavelengths, and the other for finesse >$10^4$ at the coupling laser wavelengths. Offset locking to an EOM sideband enables rapid sweeping of the coupling laser wavelength within 10 GHz of each center wavelength; the inset in FIG. 30 shows the RF tuning range of the quantum aperture given fine Δf tuning of each seed laser. The tuning and wavelength hopping hardware easily achieves all Phase 1 TC2 metrics. EOMs can be swept at >18 GHz/µs, which corresponds to a scan speed of >15 GHz/µs from 10-500 MHz, >20 GHz/µs from 0.5-2.2 GHz, and >85 GHz/µs from 2-40 GHz. The sweep rate may be limited by the photon lifetime in the cavity, estimated to be 0.5 µs. Channel switching between n=41 and n=42 (RF channel switching span ≥1.5 GHZ) is achieved using two independently stabilized seed lasers, selected by an electro-optic (EO) switch with <50 ns response time.

Figure 32:
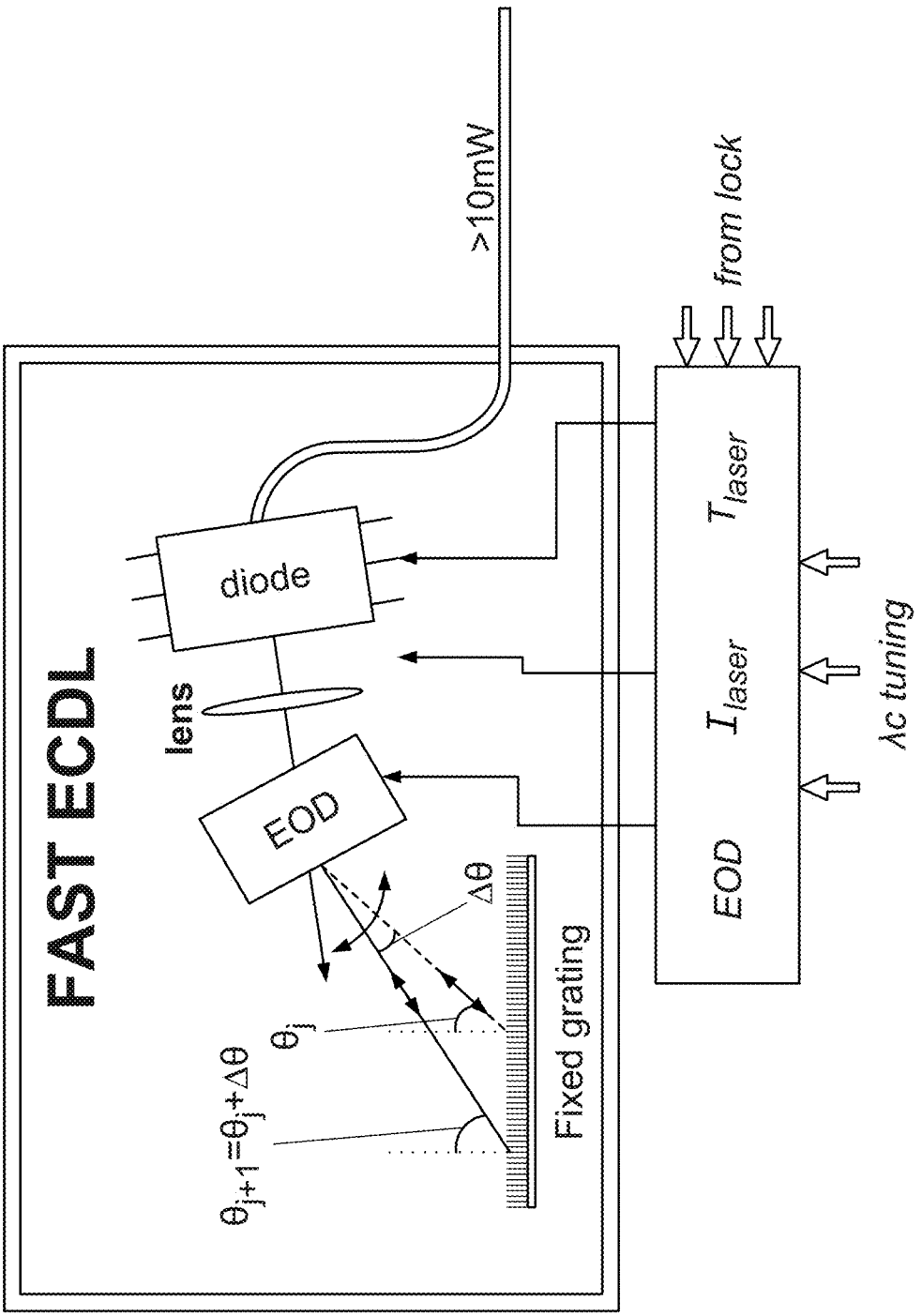
FIG. 32 (F16) shows an alternative architecture for a coupling laser for a receiver in accordance with the present invention.

A frequency agile system 3200 for tunable ECDLs ('FAST ECDL'), illustrated in FIG. 32 can be used as an alternative to the 'seed switching' approach. In a FAST ECDL, the angle between the beam and the grating is adjusted with an electro-optic or acousto-optic deflector (EOD). COTS EODs can be tuned at >200 kHz, thus with the proper geometric configuration an EOD-based FAST ECDL can sweep over the entire 20 nm optical bandwidth of an 1890 nm Fabry-Perot laser diode at 4 nm/µs. For the included cesium Rydberg states, this enables switching from n=41 to n=70 in 3.8 µs-much faster than other known single laser tuning technique—corresponding to RF channel switching span Δf>49 GHz, Δn=29.

The FAST ECDL laser system 3200 can include techniques such as simultaneous current tuning to manage mode hops. Since the FAST ECDL can achieve the switching speed metric between the three coupling laser wavelengths, it can replace the 'switched seeds' in the Phase 2 laser (the offset lock can still be used for fine adjustments and <10 GHz laser frequency sweeps). Since the re-locking time dominates, a dual FAST ECDL architecture where one laser is active while the other is switching to the next wavelength in the detection sequence can be implemented.

Figure 33:
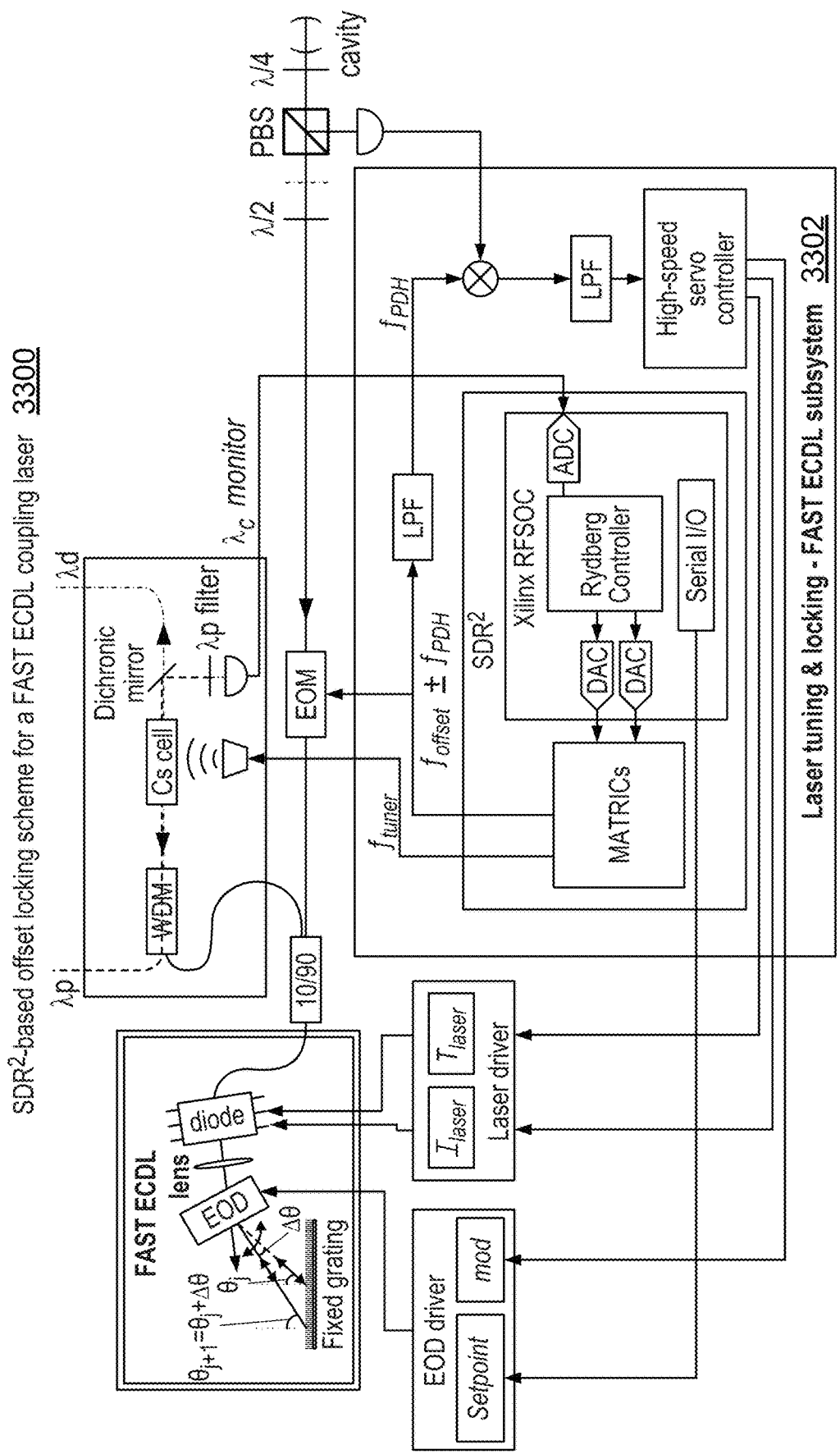
FIG. 33 (F17) is a schematic illustration of a subsystem for monitoring laser wavelengths.

The lasers are tuned primarily using the $SDR^2$ to minimize SWAP-C and to establish a roadmap for scalable, independent tuning of multiple elements in an array. To illustrate the locking approach, FIG. 33 shows an $SDR^2$-based offset locking subsystem 3302 for a FAST ECDL coupling laser using the 0-2 GHz DAC outputs. The locking approach for probe, dressing, and 'seed switching' coupling lasers is similar but with smaller tuning ranges.

Laser wavelengths are monitored using vapor cells, and the output of each monitor photodetector is sent to the RFSOC within the $SDR^2$. To confirm that the coupling laser is tuned to the correct Rydberg level, the monitor cell is configured for 3-photon EIT using the probe, dressing, and coupling lasers, and an RF signal $f_{tuner}$ set to $f_{LO}+f_{IF}$, the probe and dressing laser monitor cells only require saturated absorption spectroscopy, and do not require an RF input. Adjustment of the coarse wavelength set points is managed by the SDR2, and commands are sent to the laser drivers via the serial output for the example of the FAST ECDL, the setpoint is determined by the EOD deflection angle. A two-tone RF signal $f_{offset}+f_{PDH}$ for the offset lock EOMs is generated in MATRICs and sent to the EOM drivers ($f_{offset}$ is the lock offset frequency and is varied to tune/sweep the laser frequency over 10 GHz; $f_{PDH}$ is a low-frequency phase modulation used for the PDH lock). The RF-modulated outputs from PDH photodiodes are mixed with $f_{PDH}$ to generate PDH error signals, which are then sent to a high-speed servo controller. The use of the $SDR^2$ to manage both the laser controllers and the RF simplifies the transition to a fieldable product as much of the complication of integrating multiple controllers can be addressed up front. In Phase 1, the servos can be separate COTS modules (e.g., the Toptica FALC110).

In Phase 2, the coupling laser and laser controller enable multi-resonance tuning meeting the Phase 2, TC2 metrics. The upgraded laser can be based on either the FAST ECDL or on seed switching. The laser controller extends the laser tuning range. The differences between the Phase 1 and Phase 2 laser and laser controllers are summarized in Table 14 of FIG. 34.

The rapidly tunable Phase 2 laser system enables investigation of the merits of selecting from among numerous Rydberg states that are then tuned by smaller magnitude DC fields. The laser can hop between as few as three levels, and as many as 38 (n=42 to 70) principal quantum numbers. Hopping between more Rydberg states reduces the applied DC field required to cover the full spectrum, which in turn reduces state mixing and weakening of the dipole moment. This trade-off places a larger yet manageable burden on the laser and control system's relocking scheme. At a minimum, two more states in the 2 to 40 GHz band can be added, which yields up to a 2× factor of improved sensitivity.

The atomic response of the system can be tailored to meet channel switching and data rate metrics. Crucially, paired with an RF local oscillator, the three-photon approach allows higher Rabi frequencies to hasten the atomic response without sacrificing sensitivity. The atomic response is modeled in the same manner as the sensitivity, except one numerically integrates the time-dependent atomic response. Amplitude and phase information of the RF signal are incorporated as $\Omega_{RF} \circledR \Omega_{LO} + \Omega_{Sig} e^{-iS(t)}$, where $\Omega_{LO}$ and $\Omega_{Sig}$ are the LO and signal rabi frequencies, and S(t) is the signal and LO phase difference.

Figure 35:
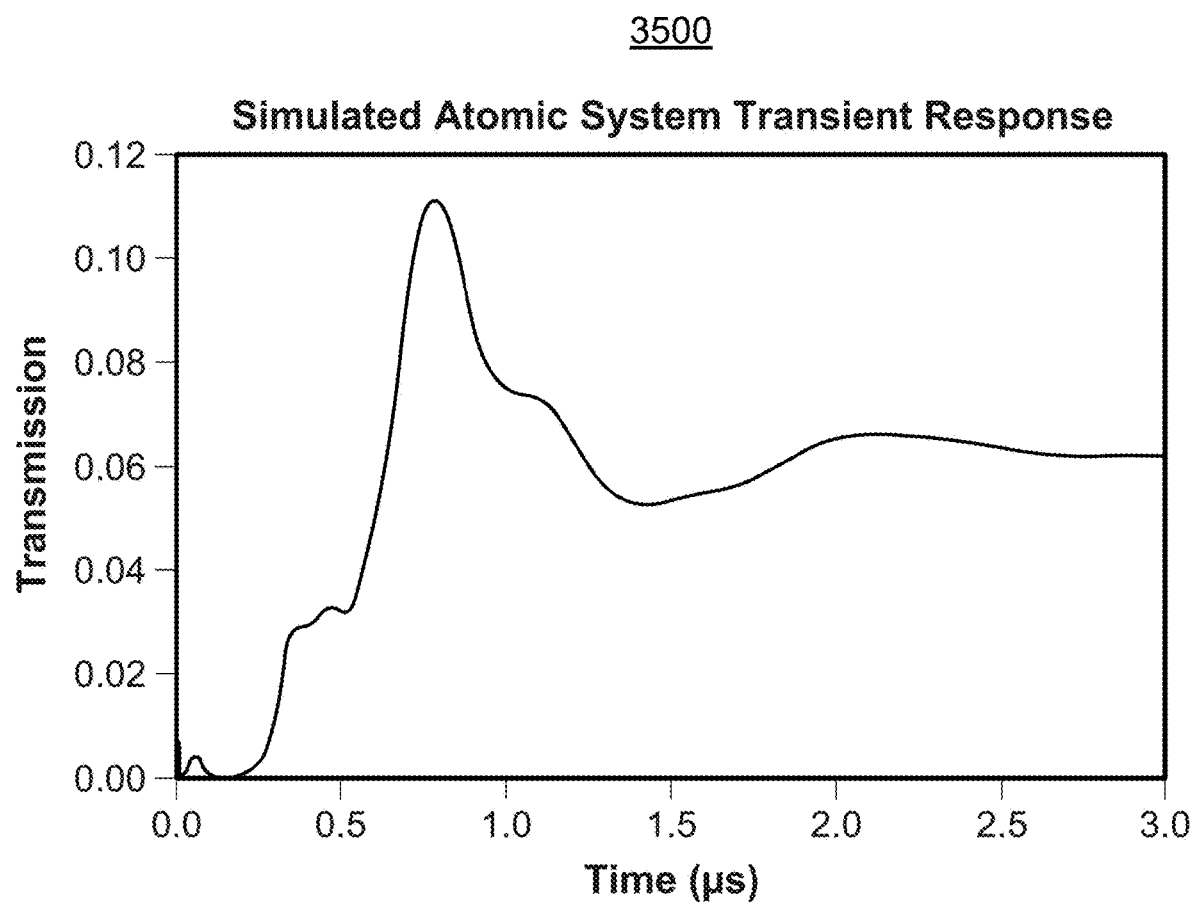
FIG. 35 (F18) is a graph of simulated atomic system transient response to channel switching in a collinear excitation beam scheme.

Using probe, dressing, coupling, and LO rabi frequencies of $[\Omega_P, \Omega D, \Omega C, \Omega_{LO}] = 2\pi \times [1, 10, 4, 10]$ MHz, respectively, there is a significant atomic response at a 10 MHz IF. Each simulation begins by switching on the three excitation fields and RF LO, which causes the initial transient in probe transmission seen in FIG. 35, which is a graph 3500 of simulated atomic system transient response to channel switching (collinear scheme), observed on probe transmission. Equilibrium is reached by 3 μs. This behavior emulates the act of switching channel center frequencies, after which the system must re-equilibrate. Steady state response is reached 2-3 μs after a new transition is addressed, and the signal dominates changes in probe transmission, which supports the Phase 2 10 μs channel switching speed metric.

Figure 36:
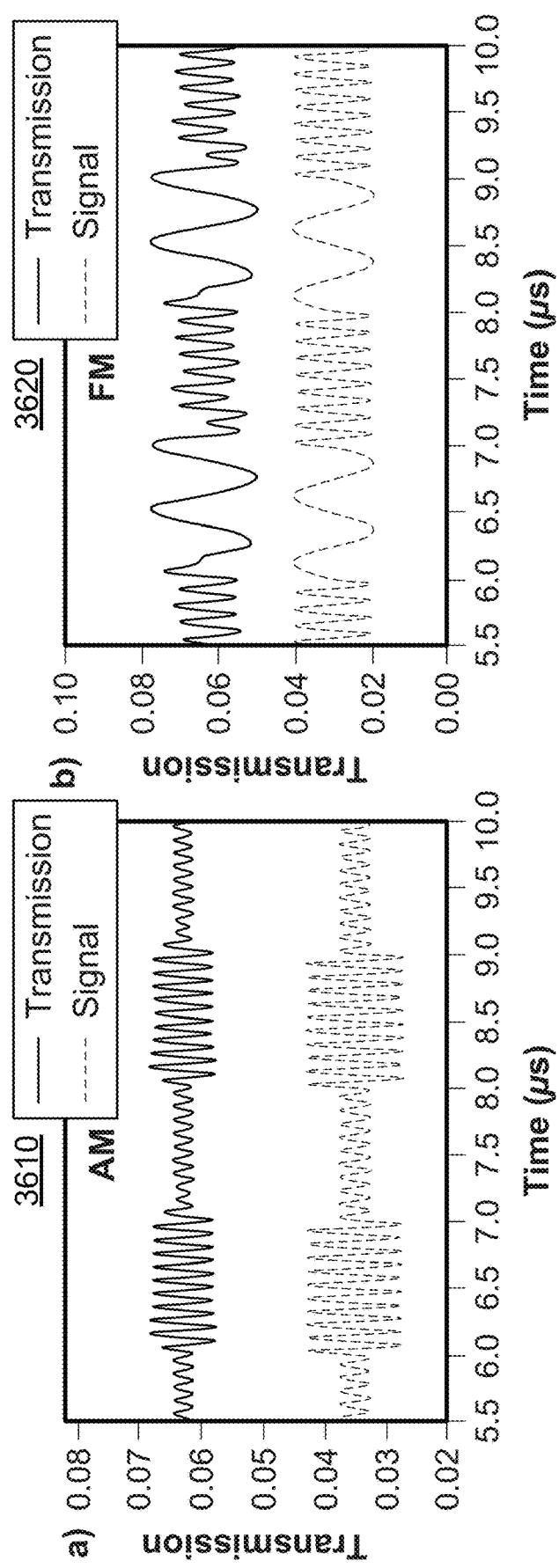
FIG. 36 (F19) includes graphs of steady state probe transmission with (a) amplitude, (b) frequency, (c) phase modulated target field.

Examples of the simulated response to amplitude, frequency and phase modulation signals are shown in FIG. 36: steady state probe transmission with (a) amplitude, (b) frequency, and (c) phase modulated target RF field at −75 dBI and 0.5 Mbit/s (for clear visualization). Upper traces show the beat-note between RF LO and target field. Lower traces show the signal modulation scheme.

The time-dependent transmission shows a sensitivity comparable to that found by the steady-state model discussed earlier: A −165 dBI incident signal at a 10 MHz intermediate frequency (IF) produces a response >5 dB stronger than the modeled noise limit. Given 10 MHz measurement bandwidth, one can expect to resolve signals at −95 dBI (−165 dBI/Hz), with headroom to further increase the IF and bit rate. Initial analysis of the possible data throughput shows AM/FM/BPSK communications at 5 Mbit/s or 16QAM communications at 5 MSymbols/s (20 Mbit/s), which exceed the Phase 2 data rate metric. These data rates are ultimately limited by the commercially available intensity of the dressing and coupling beams, reducing beam diameter can increase data rate at the loss of sensitivity due to atom number and transit time broadening.

Figure 37:
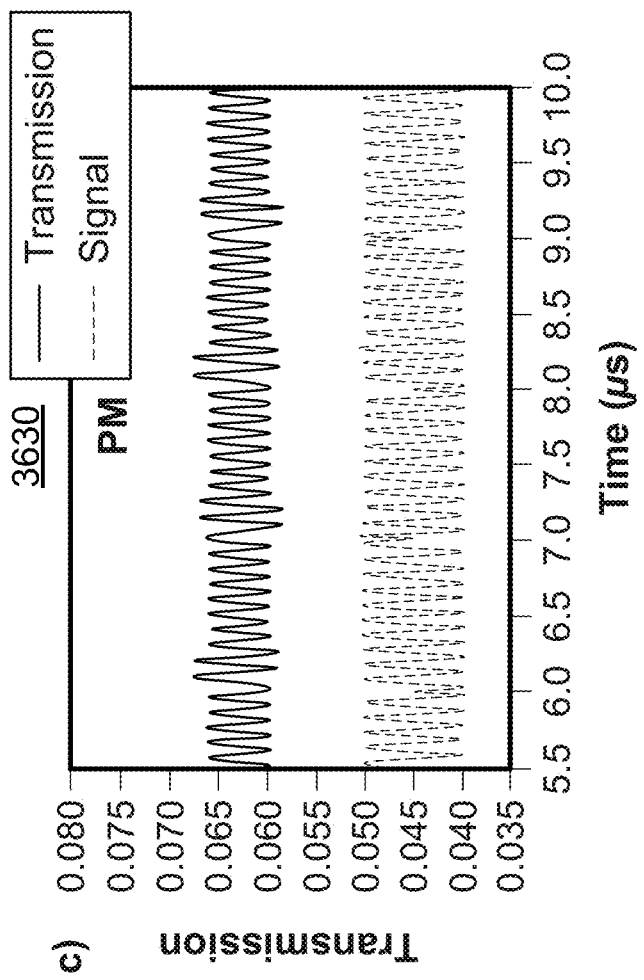
FIG. 37 (F20) is a schematic diagram of a Rydberg controller used in the receiver of FIG. 1.

System operation and tuning is managed by the SDR[2] hardware (scheme shown in FIG. 37 to meet sensitivity, tunability and arbitrary waveform challenges. In FIG. 37: Rydberg controller 3700 managers I/Q signal resynthesis, routing to demonstration modes, and high-level tuning of lasers, RF, and DC-field. At sensor turn-on, the tuner in the controller reads user settings and chooses an appropriate Rydberg state pair. The tuner sets the DC E-field according to the selected frequency band (e.g., FIG. 9) inset), and sets corresponding probe, coupling, and dressing laser frequencies and amplitudes. The tuner also configures the heterodyne RF amplitude and frequency de-tuning for maximum incident RF signal sensitivity.

When incident RF impacts the sensor, the I/Q Re-synthesizer monitors the photodetector output for initial signal detection. For strong signals, the tuner adjusts LO parameters to maintain Rydberg sensor linear response. For extremely strong signals, the controller switches to alternate sensing methods. Full specification of this adaptive control loop (supporting the largest possible range of applications, e.g., strong nearby emitters, weak signals in strong clutter or jamming) is part of the sensor trade space.

In steady state operation, the re-synthesizer creates an arbitrary waveform from photo-detector output using an optimal combination of intrinsic Rydberg sensor tuning, and advanced processing of photodetector output. Further tuning occurs as needed to handle arbitrary signal waveform characteristics, including continuous management of laser, heterodyne RF, and DC-field parameters to keep signal in place. Digital communications signal reception can be accomplished tracking the amplitude and phase of each symbol through post-processing of photodetector output. Tuning bandwidth and band center can also help differentiate closely spaced signals directly in the Rydberg sensor output, impacting TC4 of TA2.

Figure 38:
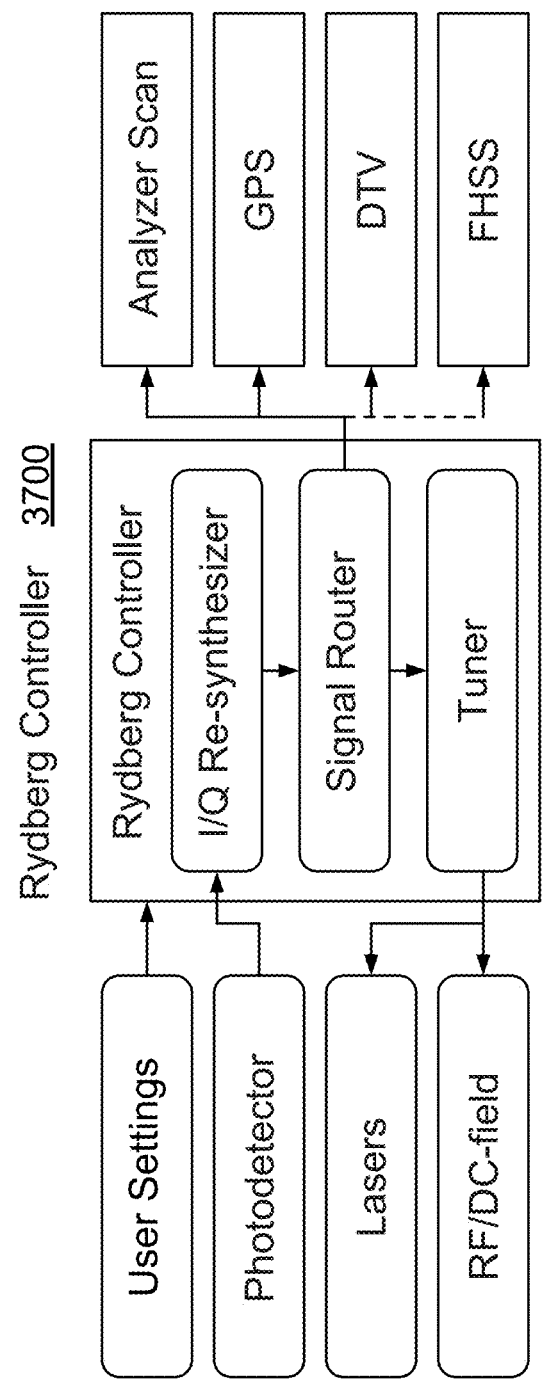
FIG. 38 (T15) is a table of advantages of the receiver of FIG. 1 and variations thereof.

This detailed technical approach has justified STEARS as a comprehensive offering for QA TA1. Table 15 of FIG. 38 summarizes the techniques and innovations supporting each metric.

In phase 1, sensitivity can be tested in a bench-top test set including the vapor cell, RF horn antenna providing the source field, as well as RF absorbing foam to mitigate confounding reflected RF signals at the position of the vapor cell. The RF field at the position of the vapor cell can be calibrated using standard techniques that compare calculated emitted field strength, based on RF horn broadcast profile and measured power into the horn, and a measurement of the AT-splitting at intermediate field strengths. These measurements provide the base field at the vapor cell position and allow accurate determination of sensitivity provided by RF heterodyne detection and vapor cell transparency. Laboratory measurements of EIA/EIT linewidths and RF detection sensitivity can be compared to model results, inputting laser and RF field parameters. These comparisons guide system improvements and provide a measure of the coherence time. In parallel, measurements of the dipole matrix element under Stark tuning can be characterized to inform the optimal Rydberg state selection.

At start of phase 1, a test laser system can be built for use in developing the advanced Rydberg electrometry physics, initially using COTS vapor cells, prior to receipt of the complete laser system. This arrangement facilitates rapid measurement technique development and provides critical design feedback to develop laser hardware. The laser hardware utilizes COTS vapor cell componentry in a simplified optical setup to allow quick, closed-loop optimization of the control system architecture, without time-consuming shipment of materials for testing. This permits fast switching and relocking the coupling laser between two adjacent Rydberg excitation wavelengths.

In parallel with the above measurement tests, a battery of tests can be implemented to validate compatibility of thin film electrodes with the alkali vapor cell environment and characterize contact bond performance under various recipes. Existing UHV bonding systems can be modified to accommodate the vapor cell form factor and small quantity batch processing techniques. Vapor cells can be characterized and replace COTS within the test setup. Due to the micro-optic development cycle time, after a short yet thorough modeling phase and design review, the baseline optical design cab be built.

Sensor head testing relevant to DoD interests can include radar cross section and RF LO field emanation measurements. Laser and $SDR^2$ systems can be characterized using the STEARS vapor cell. Channel switching speed can be determined from the settling time of the atomic response, measured on the probe signal, e.g., FIG. 35. Both the channel switching span and scan speed are determined from the initial and final Rydberg resonance frequencies, along with switching speed. Full sensor operation can be characterized and sensitivity across 1.7-2.2 GHz demonstrated. Spectrum analyzer scan mode and data rate can be implemented.

Figure 39:
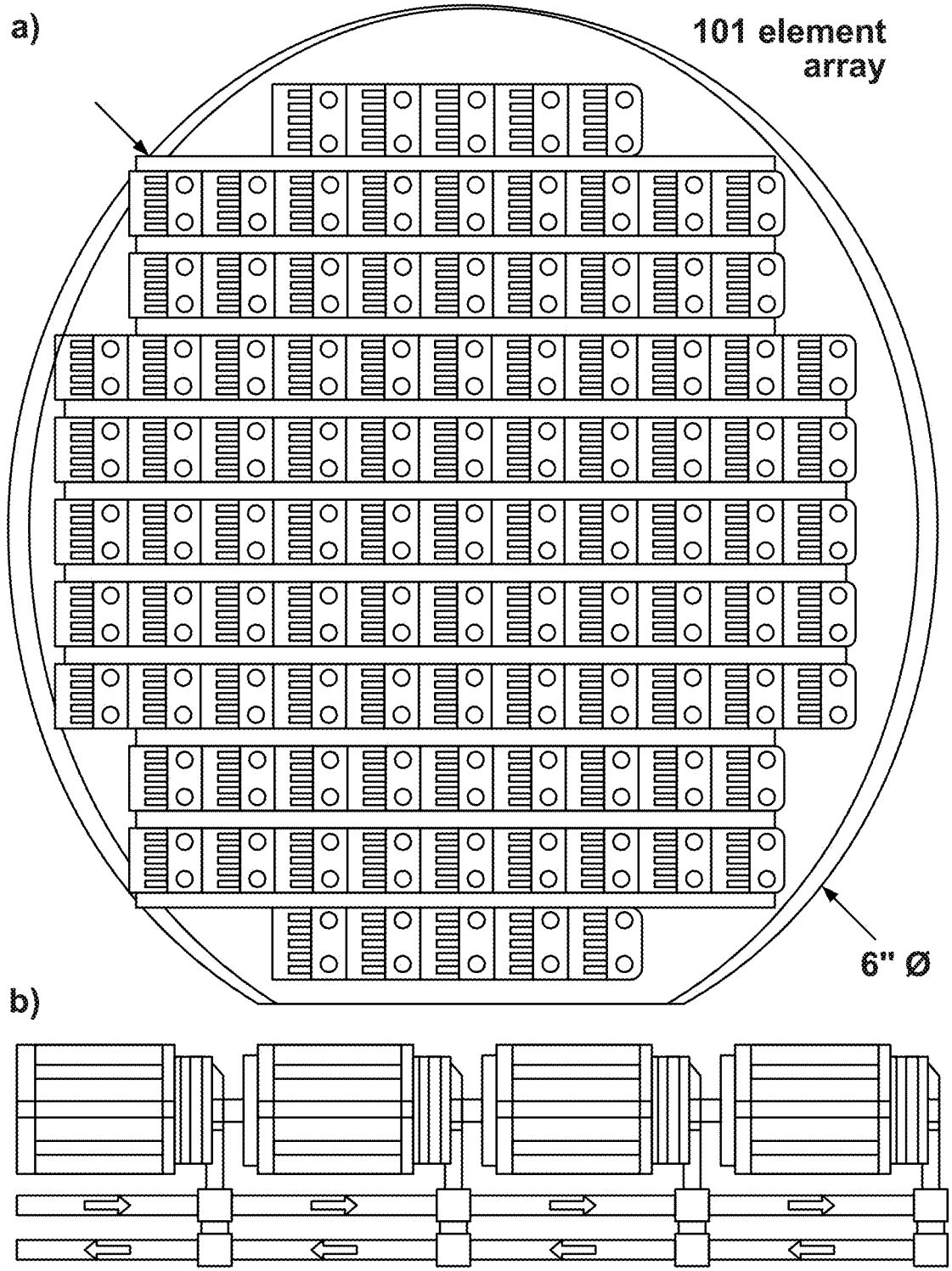
FIG. 39 (F21) is an illustration of a Stark-tuned array of Rydberg sensors.

Sensor Array-STEARS vapor cells are fabricated in batch processes that support scaling to sensor arrays. The micro-optics system is also conducive to arrayed configurations, replacing optical fiber inputs with a common light distribution plate fabricated at the wafer-level. FIG. 39 shows a conceptual rendering with light distribution and includes: a) Stark-Tuned Array of Rydberg Sensors (STARS) with 101 elements; b) side view of (a) showing optical routing and power recycling between sensor elements, and probe light extraction.

Angle of arrival (AoA) can be obtained by measuring the relative phase difference between the elements of the array. In AoA mode, set by the $SDR^2$, the monolithic array of Rydberg detectors shares the same RF LO with the same phase ($\psi_{LO}$). Suppose two channels, i and j, carry the signals from the detector i(j) in the array, the phase of the detector is $\phi_i = \psi_i - \psi_{LO}$ ($\phi_j = \psi_j - \psi_{LO}$). Where $\psi_i(\psi_j)$, is the phase of target RF field incident on element i(j), and $\phi_i(\phi_j)$, is the relative phase of target field on the element i(j) to the LO. By mixing the two signals, the phase difference can be deduced $\Delta\phi = \phi_i - \phi_j = \psi_i - \psi_j$. In this case, the relative phase between the elements of the array can be directly measured even in the presence of drift in the LO phase. Resolution of the phase measurement as low as 0.8° has been demonstrated using the disclosed, phase-sensitive RF heterodyne technique.

Given a distance L between two Rydberg detectors and target RF field wavelength λ, the angle resolution of our detector can be 0.8λ/L degree, and resolution of the angle of arrival scales with the ratio of λ/L. The configuration in FIG. 39 readily achieves 1° AoA resolution in the K and KA frequency bands.

Herein, all art labeled "prior art", if any, is admitted prior art; art not labeled "prior art", if any, is not admitted prior art. The described embodiments, variations thereupon, and modifications thereto are provided for by the present invention, the scope of which is defined by the accompanying claims.

What is claimed is:

1. A radio-frequency (RF) receiver comprising:
a vapor cell containing a vapor of quantum particles;
a laser system for pumping the quantum particles to a first Rydberg state, the first Rydberg state being a high-azimuthal Rydberg state with an azimuthal quantum number $\ell \geq 3$;
an electric field system for providing an electric field within the vapor cell, the electric field including a time varying component having a frequency of VLO, a distribution of the quantum particles in the first Rydberg state and in a second Rydberg state varying at the frequency VLO, wherein an incident RF signal having an RF frequency of VRF interferes to yield a beat frequency ΔRF that is imposed on the distribution of the quantum particles in the first Rydberg state and in the second Rydberg state; and
a detection system for detecting the incident RF signal based on the beat frequency.

2. The radio-frequency receiver of claim 1, wherein the laser system includes a probe laser for providing a probe beam transiting the vapor cell, the detection system detecting the incident RF signal based on at least one of the probe beam or fluorescence resulting from decay of the quantum particles from the first Rydberg state to a ground state.

3. The radio-frequency receiver of claim 2, wherein the laser system also includes a coupling laser and at least one dressing laser, the probe laser, the dressing laser and the coupling laser cooperating to pump the quantum particles to the first Rydberg state.

4. The radio-frequency receiver of claim 1, wherein the vapor cell has a volume not exceeding 1 cubic centimeter.

5. The radio-frequency receiver of claim 1, wherein the RF frequency of the incident RF signal is at least 10 MHz and not more than 40 GHz.

6. The radio-frequency receiver of claim 1, wherein the second Rydberg state is a high-azimuthal Rydberg state with an azimuthal quantum number $\ell \geq 4$.

7. The radio-frequency receiver of claim 1, wherein the second Rydberg state is a low-azimuthal Rydberg state with an azimuthal quantum number $\ell \geq 2$.

8. A radio-frequency receiver method comprising:
pumping quantum particles to a first Rydberg state using a laser system, the first Rydberg state being a high-azimuthal Rydberg state with an azimuthal quantum number $\ell \geq 3$;
generating an oscillating electric field having a frequency VLO withim a vapor cell, a distribution of the quantum particles in the first Rydberg state and in a second Rydberg state varying at the frequency VLO;
receiving an incident RF signal having an RF frequency VRF, wherein VLO=VRF±ΔRF, ΔRF being a beat frequency, the incident RF signal interfering with the oscillating electric field to yield the beat frequency ΔRF that is imposed on the distribution of the quantum particles in the first Rydberg state and in the second Rydberg state; and
detecting the incident RF signal based on the beat frequency.

9. The method of claim 8, wherein the laser system includes a probe laser for providing a probe beam transiting the vapor cell, and wherein the detecting further includes:
detecting the incident RF signal based on at least one of the probe beam or fluorescence resulting from decay of the quantum particles from the first Rydberg state to a ground state.

10. The method of claim 9, wherein the laser system also includes a coupling laser and at least one dressing laser, the probe laser, the dressing laser and the coupling laser cooperating to pump the quantum particles to the first Rydberg state.

11. The method of claim 8, wherein the vapor cell has a volume not exceeding 1 cubic centimeter.

12. The method of claim 8, wherein the RF frequency of the incident RF signal is at least 10 MHz and not more than 40 GHz.

13. The method of claim 8, wherein the pumping also includes using a dressing beam to transition quantum particles from an excited state to a dressed state and using a coupling beam to transition quantum particles from the excited state or another dressed state to the first Rydberg state.

14. The method of claim 8, wherein the second Rydberg state is a high-azimuthal Rydberg state with an azimuthal quantum number $\ell \geq 4$.

15. The method of claim 8, wherein the second Rydberg state is a low-azimuthal Rydberg state with an azimuthal quantum number $\ell \geq 2$.

* * * * *

UNITED STATES PATENT AND TRADEMARK OFFICE
CERTIFICATE OF CORRECTION

Page 1 of 1

| | |
|---|---|
| PATENT NO. | : 12,273,149 B2 |
| APPLICATION NO. | : 18/378591 |
| DATED | : April 8, 2025 |
| INVENTOR(S) | : Caliga et al. |

It is certified that error appears in the above-identified patent and that said Letters Patent is hereby corrected as shown below:

In the Claims

In Column 22, Line 47, in Claim 8, delete "withim" and insert --within-- therefor Signed and Sealed this
Thirtieth Day of September, 2025

John A. Squires
*Director of the United States Patent and Trademark Office*